US012390669B2

(12) United States Patent
Jacotey et al.

(10) Patent No.: US 12,390,669 B2
(45) Date of Patent: *Aug. 19, 2025

(54) REGULATOR ASSEMBLY FOR AN AIRCREW BREATHING MASK

(71) Applicant: SAFRAN AEROTECHNICS, Plaisir (FR)

(72) Inventors: Jérémy Jacotey, Moissy-Cramayel (FR); Didier Lamourette, Moissy-Cramayel (FR); Serge Moreira, Moissy-Cramayel (FR)

(73) Assignee: SAFRAN AEROTECHNICS, Plaisir (FR)

( * ) Notice: Subject to any disclaimer, the term of this patent is extended or adjusted under 35 U.S.C. 154(b) by 743 days.

This patent is subject to a terminal disclaimer.

(21) Appl. No.: 17/783,575

(22) PCT Filed: Dec. 8, 2020

(86) PCT No.: PCT/FR2020/052343

§ 371 (c)(1),
(2) Date: Jun. 8, 2022

(87) PCT Pub. No.: WO2021/116596

PCT Pub. Date: Jun. 17, 2021

(65) Prior Publication Data

US 2023/0010959 A1 Jan. 12, 2023

(30) Foreign Application Priority Data

Dec. 9, 2019 (EP) .................................... 19306605

(51) Int. Cl.

*A62B 7/14* (2006.01)
*A62B 7/02* (2006.01)
*A62B 9/02* (2006.01)

(52) U.S. Cl.

CPC .................. *A62B 7/14* (2013.01); *A62B 7/02* (2013.01); *A62B 9/02* (2013.01)

(58) Field of Classification Search

CPC .... A62B 7/14; A62B 9/00; A62B 9/02; F16K 35/025

See application file for complete search history.

(56) References Cited

U.S. PATENT DOCUMENTS 4,054,133 A * 10/1977 Myers ............... A61M 16/0677 128/207.18
4,915,132 A * 4/1990 Hodge ................ F16K 11/0743 128/205.24

(Continued)

FOREIGN PATENT DOCUMENTS

EP 2732833 A1 * 5/2014 .............. A61M 1/74
EP 2873433 A1 * 5/2015 ........ A61M 16/0833

(Continued)

OTHER PUBLICATIONS

English translation of Written Opinion mailed Apr. 14, 2021, issued in corresponding International Application No. PCT/FR2020/052343, filed Dec. 8, 2020, 6 pages.

(Continued)

*Primary Examiner* — Kathryn E Ditmer
(74) *Attorney, Agent, or Firm* — CHRISTENSEN O'CONNOR JOHNSON KINDNESS PLLC

(57) ABSTRACT

A regulator assembly for an aircrew breathing mask includes a support and a mode selection knob mounted with the ability to pivot on the support. The selection knob is able to pivot between at least a first position, a second position and a third position. The mask further includes regulator designed to supply a breathing cavity at least in three modes of operation according to the position of the mode selection knob. At least one locking/unlocking device locks and unlocks the rotation of the mode selection knob towards the (Continued)

third position. The locking/unlocking device comprising has an operating member that pivots between a position in which the rotation of the mode selection knob is locked, and a position in which the rotation of the mode selection knob is unlocked.

15 Claims, 19 Drawing Sheets

(56) References Cited

U.S. PATENT DOCUMENTS

| | | | | | |
|---|---|---|---|---|---|
| 4,928,682 | A * | 5/1990 | Stevenson | A62B 9/022 | 128/205.24 |
| 5,207,641 | A * | 5/1993 | Allton | A61M 16/0463 | 604/32 |
| 5,746,199 | A * | 5/1998 | Bayron | A61M 16/20 | 128/205.24 |
| 5,913,307 | A * | 6/1999 | Taieb | A62B 18/08 | 128/205.24 |
| 2012/0017914 | A1* | 1/2012 | Watt Lanyau | A61M 16/04 | 128/207.14 |
| 2012/0080628 | A1* | 4/2012 | Buergi | F16K 35/025 | 251/249.5 |
| 2013/0306073 | A1* | 11/2013 | Fromage | A62B 9/022 | 128/204.22 |
| 2017/0235328 | A1* | 8/2017 | Swayne | F16K 35/025 | 74/532 |

FOREIGN PATENT DOCUMENTS

| | | | | |
|---|---|---|---|---|
| EP | 2937113 | A1 * | 10/2015 | A62B 7/14 |
| WO | WO-2012129736 | A1 * | 10/2012 | F16K 35/04 |
| WO | WO-2017044582 | A1 * | 3/2017 | A62B 7/04 |

OTHER PUBLICATIONS

International Preliminary Report on Patentability mailed May 17, 2022, issued in corresponding International Application No. PCT/FR2020/052343, filed Dec. 8, 2020, 7 pages.

International Search Report mailed Apr. 14, 2021, issued in corresponding International Application No. PCT/FR2020/052343, filed Dec. 8, 2020, 5 pages.

Written Opinion mailed Apr. 14, 2021, issued in corresponding International Application No. PCT/FR2020/052343, filed Dec. 8, 2020, 6 pages.

* cited by examiner

REGULATOR ASSEMBLY FOR AN AIRCREW BREATHING MASK

The present disclosure relates to a control unit for an aircraft crew member's breathing mask.

In a known manner, such a control unit for an aircraft crew member's breathing mask comprises:

- a holder,
- a mode-selection knob pivotally mounted on the holder about an axis of rotation between at least a first position EMER, a second position 100% and a third position N,
- a controller intended to be supplied from a source of breathing gas and adapted to supply a breathing cavity in at least three of the following modes of operation:
- when the mode-selector switch is in the first EMER position, the controller supplies the breathing cavity as long as the pressure in the breathing cavity is not higher than a first relative pressure to the ambient pressure,
- when the mode-selector switch is in the second position 100%, the controller supplies the breathing cavity as long as the pressure in the breathing cavity is not higher than a second pressure relative to the ambient pressure, the first pressure being higher than the second pressure,
- when the mode-selector switch is in the third position N, the controller supplies the breathing cavity with breathing gas diluted with air.

The first position "EMER" corresponds to the "EMERGENCY" mode. It is selected in the event of smoke or fire in the cockpit. The second position "100%" corresponds to the "100%" mode. It offers protection against hypoxia. The third position "N" corresponds to the "NORMAL" mode. It can be used to limit oxygen consumption in preventive wear or on a descent profile landing. The selection button is by default in the second 100% position. The second 100% position is located in the middle between the first and third positions.

The mode-selection button is not visible to the user when the mask is worn. Currently, the selection button is asymmetrical to allow the user to distinguish between the direction of rotation leading to "EMERGENCY" and "NORMAL" mode by touch. The selection button also has side markings to allow verification of the selected mode by a third party. Thus, current breathing masks have means of providing information on the selected mode of operation to the user, by means of the asymmetry of the button, and to third parties, by means of the side markings.

Despite this asymmetry, without significant knowledge and frequent use of the respirator, it is difficult to know the direction of rotation between the "EMERGENCY" and "NORMAL" modes. In particular, in the event of a sudden emergency, the user may accidentally rotate the selection knob to "NORMAL" mode and lose protection against toxic fumes and gases. The user can select the wrong mode of operation if the information is misunderstood or if the user reacts in haste.

The present disclosure is intended to provide a control unit that prevents accidental selection of "NORMAL" mode instead of "EMERGENCY" mode. The present disclosure is intended to increase the level of safety of oxygen mask control units by preventing misuse of the mode-selection button.

The invention improves the situation.

The invention relates to a control unit for a respiratory mask comprising at least one locking/unlocking system adapted to lock and unlock the rotation of the mode-selection knob towards the third position, the locking/unlocking system comprising a operating member adapted to be pivoted between a position of locking the rotation of the mode-selection knob, and a position of unlocking the rotation of the mode-selection knob.

Advantageously, the present disclosure mechanically prevents the selection of a wrong operating mode.

The features set out in the following paragraphs can optionally be implemented. They can be implemented independently of each other or in combination with each other:

- the second position is positioned between the first position and the third position, and wherein said locking/unlocking system comprises an aperture formed in said holder; said aperture comprising a radial stop delimiting a first aperture portion and a second aperture portion, and wherein the operating member comprises a lug adapted to slide in the first aperture portion and to abut against said radial stop when the operating member is positioned in the locking position, said lug being adapted to slide in at least the second aperture portion, when the operating member is in the unlocking position.
- said aperture is in the form of at least one circular arc centred on the axis of rotation.
- the first aperture portion and the second aperture portion have the shape of an arc of a circle and wherein the arc of the circle of the second aperture portion has a radius different from the radius of the arc of the circle of the first aperture portion; the first aperture portion having a radial end wall forming a radial stop locking the passage of the lug in the second aperture portion when the operating member is in the locking position.
- the first aperture portion extends over a first angular sector and wherein the second aperture portion extends over the first angular sector and a further angular sector.
- the lug has a radial face extending perpendicular to the bottom of the mode-selector knob, said face bearing flat against the radial stop when the operating member is in the locking position.
- the operating member comprises a lever mounted to pivot relative to the mode-selection knob about a first pivot axis, the first pivot axis being parallel to the axis of rotation.
- said lug and said radial stop are disposed on one side of a plane, and wherein the operating member comprises an operating area disposed on the other side of said plane, said operating area being an area on which the user acts to unlock the rotation of the mode-selection knob; said plane being perpendicular to the bottom and passing through said first pivot axis and an end stop.
- the locking/unlocking system comprises a resilient element adapted to hold the operating member in the locking position, the resilient element being adapted to act between the operating member and a support wall of the mode-selection button.
- the resilient element comprises at least one compression spring adapted to be compressed by pressing on a part of the operating member to unlock the rotation of the mode-selection knob towards the third position.
- the support wall of the mode-selector button and/or the operating member comprises a guide suitable for guiding the resilient element during its compression; said guide comprising one of a circular housing and a guide pin.
- the peripheral rim of the mode-selector button has a through-opening, and wherein the operating member extends through said through-opening.
- the peripheral rim of the mode-selection button comprises a slot perpendicular to the axis of rotation which is extended by a cut-out parallel to the axis of rotation and opening out to the outside of the mode-selection button, and wherein a part of the peripheral rim delimited by the said slot and the said cut-out forms the operating member, the operating member being capable of pivoting by deformation of an axial part of the peripheral rim.

the operating member has a through-recess, part of the through-recess is in the form of a flare, another part of the through-recess having a re-entrant wedge open to the flare, and wherein the support wall is perpendicular to the bottom and extends into the through-recess, said support wall being provided with a radial notch, the resilient element comprising at least one leaf spring wedgedly attached in said radial notch and in the re-entrant wedge.

the operating member comprises a through-recess, a part of the through-recess having a cylindrical shape, and wherein the support wall comprises at one of its ends a pivot arranged in the cylindrical part of the recess, said pivot forming the first pivot axis.

DETAILED DESCRIPTION OF THE INVENTION

The drawings and the description below contain, for the most part, elements of a definite nature. They may therefore not only serve to further the understanding of the present disclosure, but also contribute to its definition, where appropriate.

Figure 1:
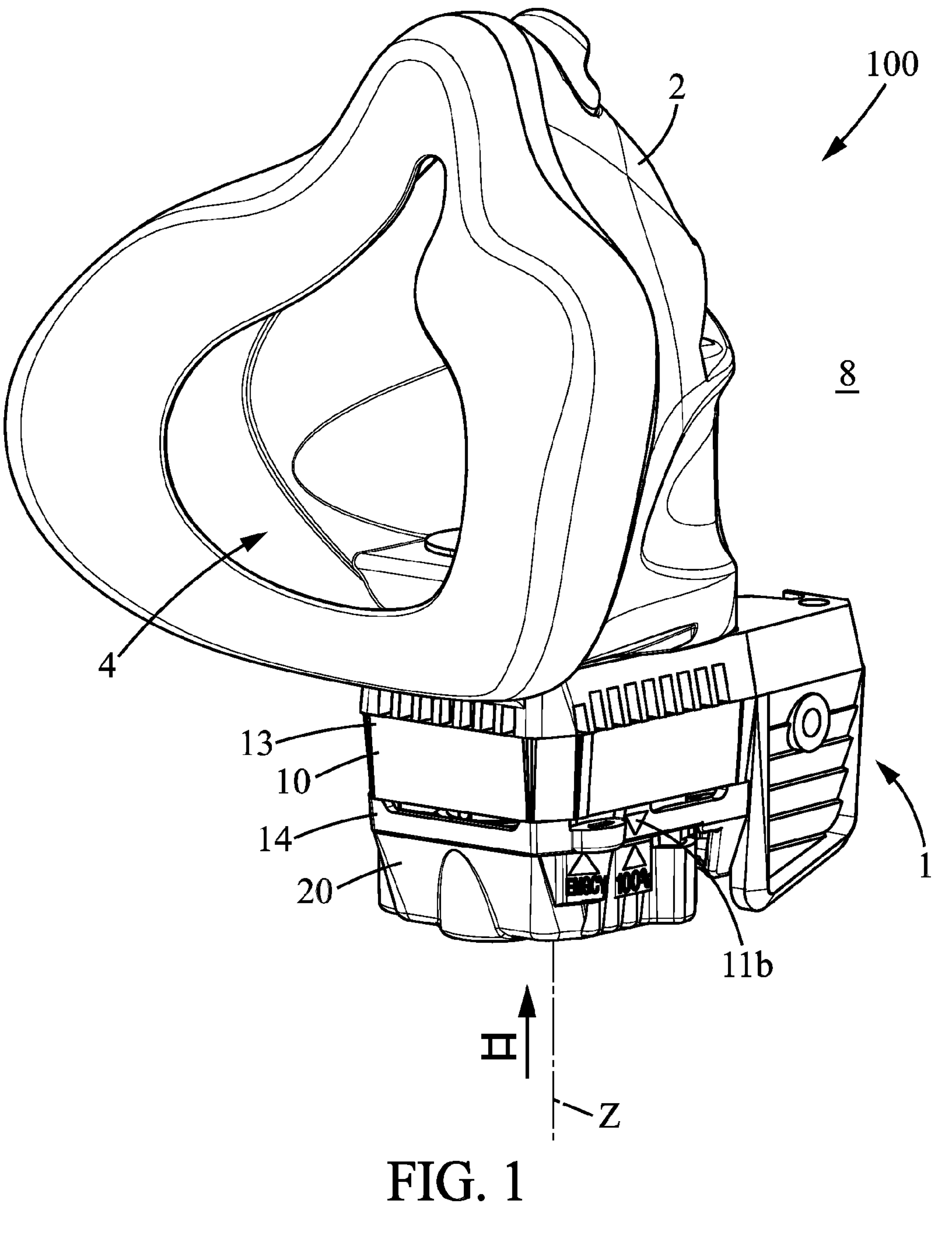
FIG. 1 is a perspective view of a breathing mask with a control unit according to the present invention.

FIG. 1 illustrates a breathing mask 100 arranged in a pressurised cabin 8 of a commercial aircraft intended to carry crew members and usually also passengers.

A device, preferably of the so-called isobaric type, pressurises the cabin to not less than a pressurisation pressure, generally corresponding to an altitude of between 1500 metres and 2400 metres. As the aircraft rises, the pressure in the cabin is substantially equal to the pressure outside the cabin and decreases, until it reaches the said pressurisation pressure. Under normal conditions, the cabin pressure is then held constant until the pressure outside the cabin becomes lower than the pressurisation pressure. The purpose of the breathing mask is to provide the user with sufficient oxygen and protection from harmful substances in the event of incidents, such as loss of pressure, the presence of toxic gases or the like, preventing the occupants of the cabin from breathing normally.

The breathing mask 100 comprises a face-cover 2 and a control unit 1 according to a first embodiment of the invention.

The oronasal face-cover 2 is intended to be applied substantially tightly to a user's face around the nose and mouth. The oronasal face-cover 2 has a breathing cavity 4 wherein the user breathes.

The control unit 1 according to the first embodiment comprises a holder 10, a controller, a mode-selection knob 20 mounted with the ability to pivot on the holder 10 about an axis of rotation Z and a device for locking/unlocking 30 the rotation of the selection knob.

In this application, the term "radial" and "axial" is defined with respect to the Z axis of rotation, except where another axis is explicitly mentioned.

In the embodiment shown, the holder 10 comprises a housing 13 and a cover 14 adapted to close the housing. The housing 13 is provided with a breathing-gas supply orifice 6 for receiving the end of a hose to connect the controller to a source of breathing gas containing primarily oxygen.

The controller is housed in the housing 13. It operates in three modes. In the first operating mode, called "EMERGENCY" mode, the controller supplies the breathing cavity 4 only with breathing gas until a slight overpressure is reached in the breathing cavity 4 compared to the ambient cabin air pressure, generally this overpressure is between 3 mbar and 30 mbar. At the most common overpressure values, between 3 and 7 mbar, this overpressure value is hardly felt by the user. Above 10 to 12 mbar, the overpressure requires a substantial additional effort from the user to breathe which is quickly felt by the user.

In the second mode of operation, referred to as "100% mode", the controller supplies the breathing cavity 4 with breathing gas only until substantially ambient pressure is reached. In practice, it is generally useful to provide for the supply to the breathing cavity to be stopped before the breathing cavity reaches ambient pressure, so that there is a very slight negative pressure (a few tenths of mbar to a few mbar) in the breathing cavity 4

The third breathing mode, known as "NORMAL", differs from the second breathing mode in that the breathing cavity 4 is supplied with breathing gas diluted with air, generally ambient air, the proportion of which is usually a function of the pressure in the cabin 8.

Figure 2:
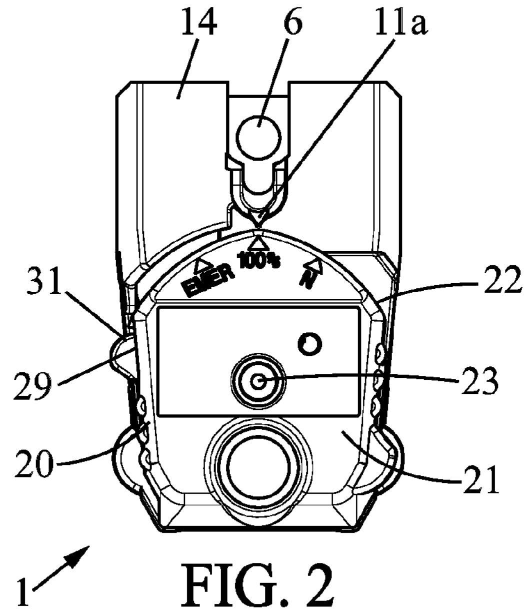
FIG. 2 is a view of one side of the control unit according to the invention, said side being marked with arrow II in FIG. 1.

With reference to FIG. 2, the mode-selector switch 20 has a first position marked "EMER" and controlling the controller to operate in the first mode. The mode-selector switch 20 has a second position marked "100%" and controlling the controller to operate in the second mode. The mode-selector switch 20 has a third position marked "N" and commands the controller to operate in the third mode. The middle position of the selection knob corresponds to the second position. In the illustrated embodiment, the third position "N" is located to the right of the centre position. Thus, the mode-selection knob 20 must be rotated counter-clockwise from the second position to the third position.

In the illustrated embodiment, the axis of rotation Z of the selector button extends substantially vertically when the user holds his or her head vertically, so that the mode-selector button 20 extends below the holder 10. Of course, the mode-selection button 20 could be placed differently, in particular on the front of the holder 10 and/or with an axis of rotation extending substantially horizontally. In a known manner, the three positions of the mode-selector button are discrete positions embodied by notches.

The mode-selector switch 20 has a bottom 21, a peripheral edge 22 surrounding the bottom and a rod 23 for attachment to the holder 10. The bottom 21 comprises an opening surrounded by an axial ring 24. The attachment rod 23 is arranged in the orifice. It forms the axis of rotation Z of the selection knob 20.

In the illustrated embodiment, EMER, 100% and N are marked on the bottom 21 and on the peripheral edge 22 of the selection button. A marker 11*a* is arranged in the centre of the width of the cover 14 and two side markers 11*b* are arranged on the edges of the housing 13 to show the mode-selection position 20.

The locking/unlocking system 30 is adapted to lock and unlock the rotation of the mode-selection knob from the second position 100% to the third position N. The locking/unlocking system 30 comprises an operating member 31 adapted to be moved between a locking position and an unlocking position, and a through aperture 32 formed in the holder 10 shown in FIGS. 4 and 5.

Figure 3:
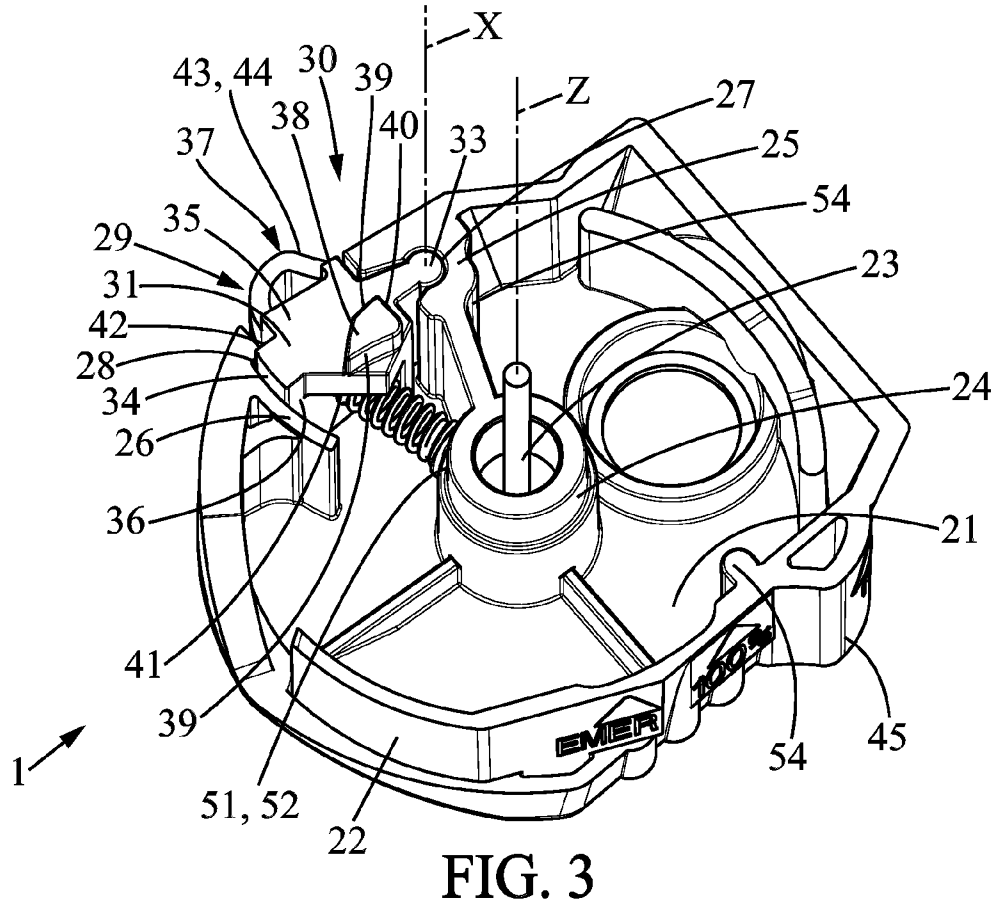
FIG. 3 is a perspective view of the mode-selection button according to a first embodiment of the control unit according to the invention.

With reference to FIG. 3, the mode-selection knob 20 accommodates the operating member 31. For this purpose, the mode-selection knob 20 comprises a support block 25 and a guiding and stopping wall 26 of the operating member. The support block 25 is provided with a tubular cavity 27 extending in the direction of the rotation axis Z. The guide and stop wall 26 has a rounded face centred on the tubular cavity 27. A side part of the peripheral edge 22 has a through-opening 29 of substantially rectangular shape.

A portion of the peripheral edge 22 adjacent to the opening 29 and the guide and stop wall 26 forms a locking stop 28 against which the operating member 31 bears, when positioned in the locking position, as shown in FIG. 3.

According to the embodiment shown, the operating member 31 is formed by a lever mounted so as to pivot with respect to the selection knob 20 about a first pivot axis X. The first pivot axis X is parallel to the axis of rotation Z.

The operating member 31 comprises a pivot 33 at one end, an end face 34 at the other end, two main faces 35 parallel to the bottom 31 and two side faces 36, 37 parallel to each other and perpendicular to the bottom 31.

The pivot 33 is arranged in the tubular cavity 26 of the selector button support block. The end face 34 is positioned opposite the guide and stop wall 26. When the operating member 31 is pivoted into the release position, the operating member is guided along its travel by the guide and stop wall 26.

One of the main faces 35 of the operating member arranged in line with the cover 14 is equipped with a lug 38 extending in the direction of the axis of rotation Z. In the illustrated embodiment, the lug 38 has the general shape of a quadrilateral with two slightly rounded opposing faces 39 having the axis of rotation Z as their centre, and a radial face 40 which is for example flat. A normal vector to this radial face 40 is directed in a direction from the second position 100% to the third position N.

An inner side face 36 of the operating member is equipped with a circular housing 41 extending radially with respect to the axis of rotation Z. The other side face 37 has a support wall 42 and a first projecting portion 43. The bearing wall 42 bears against the locking stop 28 when the operating member 31 is in the locking position. The first projecting portion 43 is capable of passing through the opening 29 of the peripheral edge, when the operating member 31 is in the locking position. This first protruding portion 43 comprises an operating area 44 which the user is adapted to press to rotate the operating member 31 from the locking position to the unlocking position.

In the illustrated embodiment, the mode-selection knob 20 further has a second projecting portion 45 diametrically opposite the first projecting portion 43 with respect to the axis of rotation Z. This asymmetry makes it easier to recognise the position of the selection button 20 relative to the holder 10 by touch.

Figure 4:
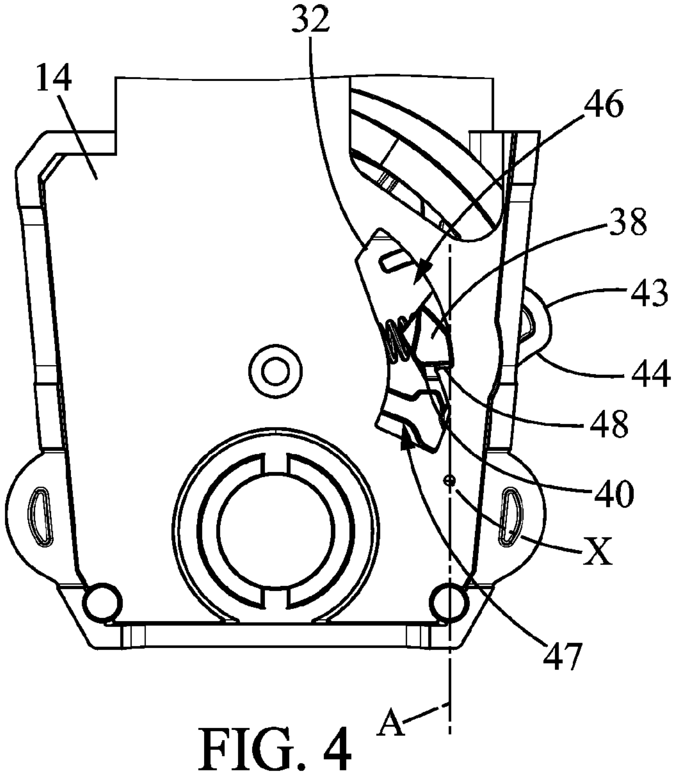
FIG. 4 is a view of a rear face of a cover of the control unit according to the first embodiment of the present invention, when the mode-selection knob is in a locking position.
Figure 5:
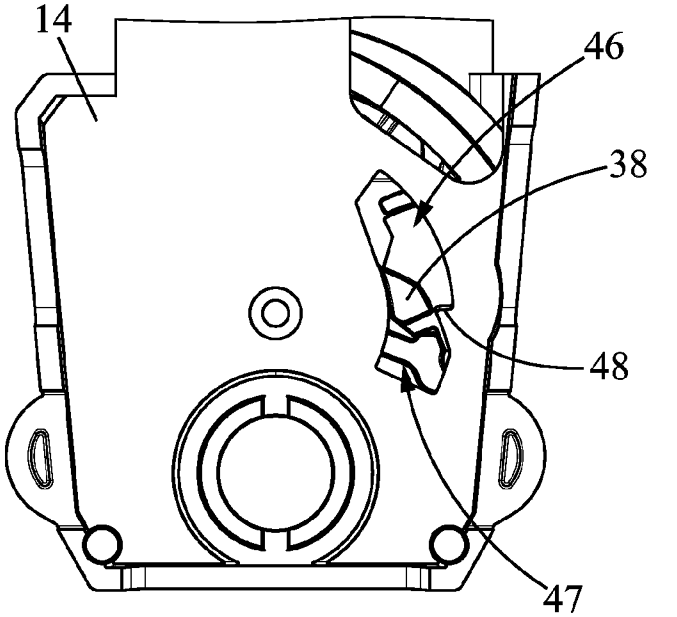
FIG. 5 is a view of a rear face of a cover of the control unit according to the first embodiment of the present invention, when the mode-selection knob is in an unlocked position.

With reference to FIGS. 4 and 5, the lug 38 of the operating member is arranged in the aperture 32. The lug 38 is adapted to slide in the aperture 32, when the user turns the mode-selector knob 20. The aperture 32 formed in the cover 14 has a first aperture portion 46 and a second aperture portion 47 communicating with the first aperture portion. The first and second light portions 46, 47 are each substantially in the shape of a circular arc centred on the axis of rotation Z. The radius of the arc of the first aperture portion 46 is greater than the radius of the arc of the second aperture portion.

In the illustrated embodiment, the first aperture portion 46 extends over a first angular sector. The second portion of aperture 47 extends over the same first angular sector as well as an additional angular sector. The first angular sector corresponds to the travel of the mode selector switch 20 between the first EMER position and the second 100% position. The additional angular sector corresponds to the travel of the mode-selection knob between the second 100% position and the third N position.

The end of the first aperture portion 46 adjacent to the additional angular sector of the second aperture portion 47 comprises a radial wall. This radial wall forms a radial end stop 48 preventing the passage of the lug 38 into the second aperture portion 47, when the operating member 31 is in the locking position. A vector normal to this radial end stop 48 is directed towards the first EMER position.

When the operating member 31 is in the unlocking position, the lug 38 can slide from the second aperture portion 47 to the first aperture portion 46. In this way, the user can quickly turn the mode-selection knob 20 from the third position N to the first position EMER without putting the operating member 31 in the locking position or waiting for it to return to the locking position under the action of a resilient element 50.

With reference to FIG. 3, the locking/unlocking system 30 further comprises a resilient element 50 suitable for holding the operating member 31 in the locking position. In the embodiment shown in FIGS. 3 to 5, the resilient element 50 is constituted by a compression spring adapted to be compressed by bearing on the operating area 44 of the operating member. It is suitable for acting between the operating member 31 and a support wall 51 formed on the axial ring 24 of the selection button. Preferably, the support wall 51 is a flat surface. The support wall 51 extends perpendicular to the bottom 21 and in line with the through-opening 29. Preferably, the support wall 51 comprises a guide pin 52.

The resilient element 50 is, on the one hand, fitted around the guide pin 52 and, on the other hand, arranged in the circular housing 41 of the operating member. The guide pin 52 and the circular housing 41 guide the resilient element 50 during its compression.

Preferably, the cover 14 comprises two reliefs 53 (visible in FIGS. 6, 8 and 10) adapted to come into end stop against two protrusions 54 (visible in FIG. 3) of the mode-selection knob to prevent the rotation of the selection knob beyond the first position EMER or beyond the third position N.

In the illustrated embodiment, the lug 38 and the radial end stop 48 of the aperture 32 are arranged on one side of a plane A perpendicular to the bottom 31 and passing through the first pivot axis X. The actuating zone 44 of the operating member 31 is arranged on the other side of the plane A. Alternatively, the actuating zone 44 of the operating member 31 is arranged on the same side of the plane A.

Alternatively, the second aperture portion 47 may communicate with only part of the first aperture portion 46.

According to a less advantageous variant, the radius of the arc of a circle of the second aperture portion 47 is greater than the radius of the arc of a circle of the first aperture portion 46. In this case, the user has to pull the first protruding portion 43 to unlock the rotation of the mode-selection knob 20 from the second position 100% to the third position N.

Alternatively, the aperture 32 has the shape of an arc of a circle with the same diameter and a radial groove in its middle to form the radial stop 48.

At rest, the operating member 31 is in the locked position. The user can rotate the mode-selector switch 20 between the first EMER position and the second N position. When the user rotates the mode-selector switch 20 from the first EMER position to the second 100% position, the lug 38 slides into the first aperture portion 46. However, the user cannot rotate the mode-selector knob 20 to the third position N because the lug 38 abuts the radial stop 48 as seen in FIG. 4. In order to be able to rotate the mode-selector switch 20 to the third position N, the user must press the operating area 44, the operating member 31 then rotates about the first pivot axis X. The resilient element 50 is compressed. The lug 38 slides from the first aperture portion 46 to the second aperture portion 47. The user can then turn the mode-selector switch to the third position N. The lug 38 slides into the second aperture portion 47 as shown in FIG. 5.

Figure 6:
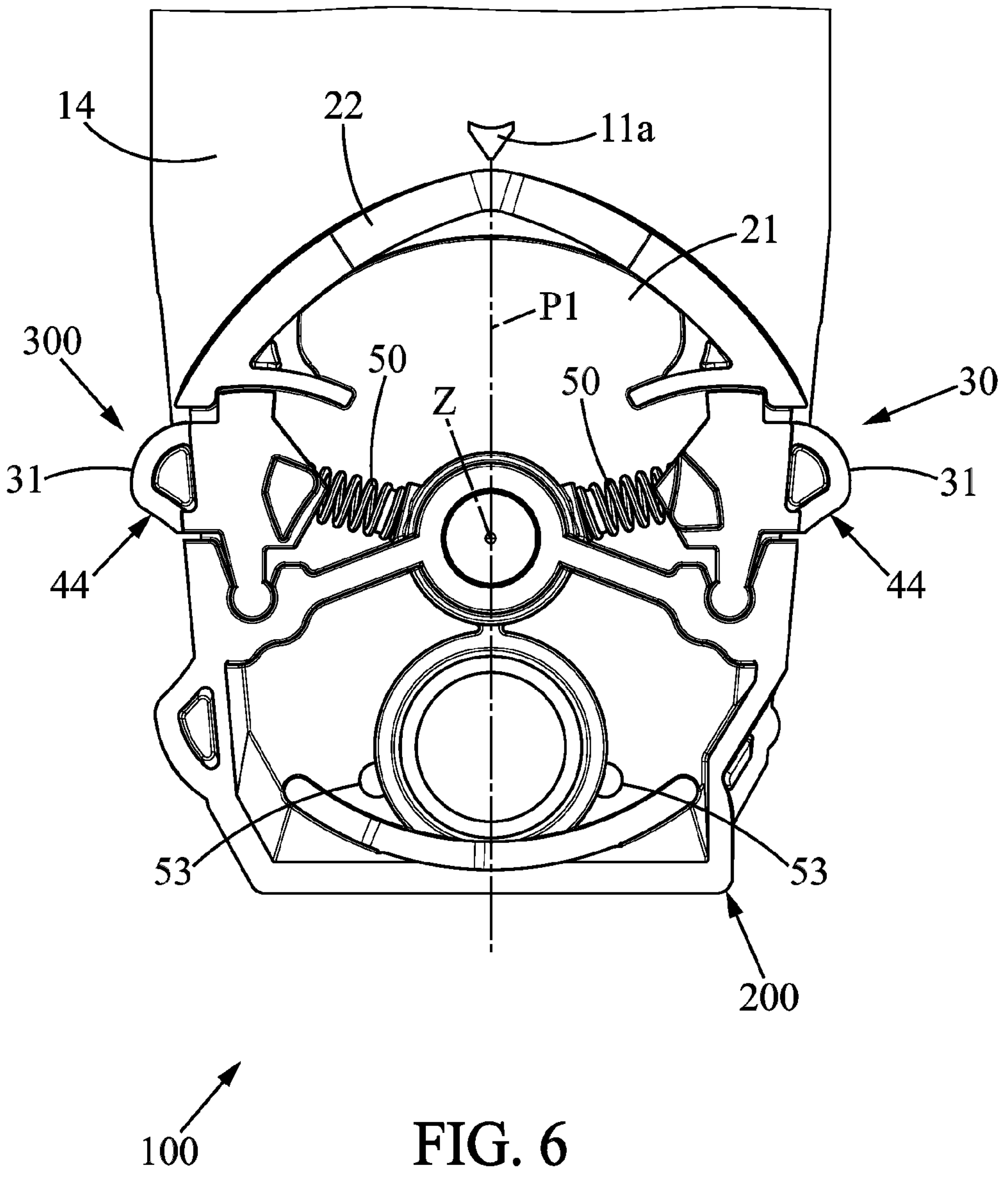
FIG. 6 is a front view of a first variant of the mode-selection button according to the first embodiment of the invention.
Figure 7:
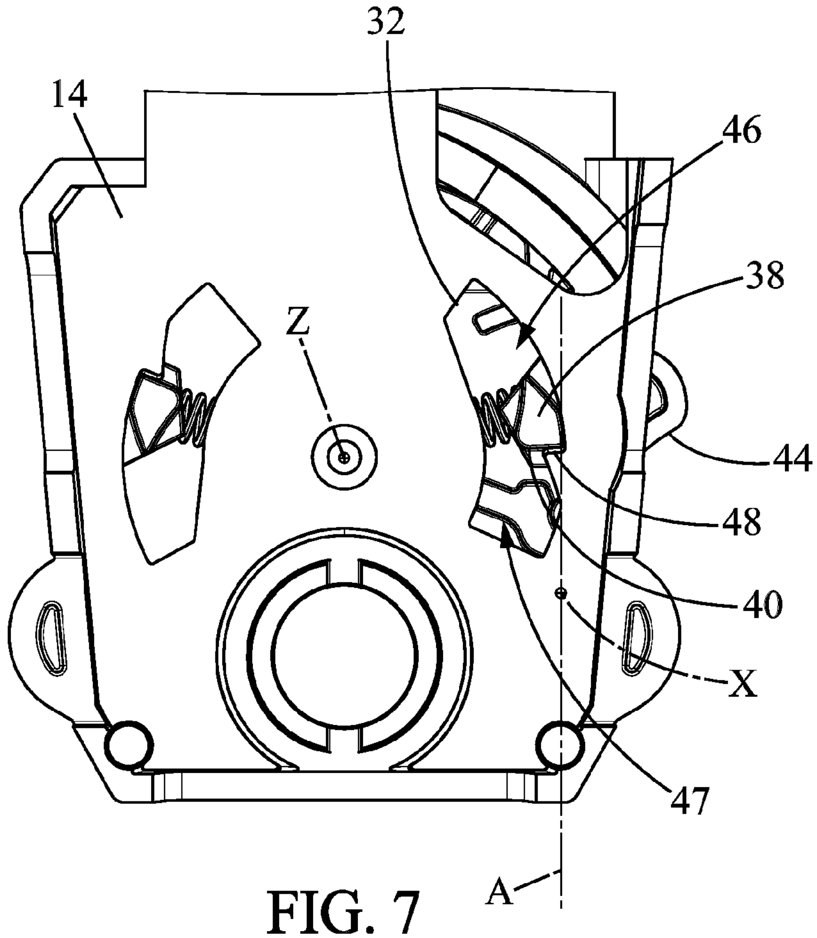
FIG. 7 is a view of a rear side of the first variant of the mode-selection button shown in FIG. 6.

Advantageously, the lug 31 is able to slide in the first aperture portion and in the second aperture portion when the operating member 31 is in the unlocking position. FIGS. 6 and 7 illustrate a first variant 100 of the first embodiment of the control unit. According to this embodiment, the control unit 100 comprises a mode-selector button 200, a first locking/unlocking system 30 and a second locking/unlocking system 300 arranged in the mode-selector button 200. The first locking/unlocking system 30 is identical to the previously described locking/unlocking system 30 and will not be described a second time. The second locking/unlocking system 300 has the same technical elements as the locking device 30 of the previously described control unit 1, but these technical elements are arranged differently. The operating member 31 and the resilient element 50 are arranged symmetrically with respect to a radial plane P1. The lug 38 of the second locking/unlocking system 300 is rotated through an angle of approximately 150°. The aperture 32 of the cover 14 is rotated through an angle of 180° about the axis of rotation Z.

The radial plane P1 is perpendicular to the bottom 21 of the mode-selection knob. The radial plane P1 passes through the axis of rotation Z.

In the embodiment shown, the radial plane P1 also passes through a point at the centre of the width of the cover 14. This centre is indicated by the mark 11*a*.

Figure 8:
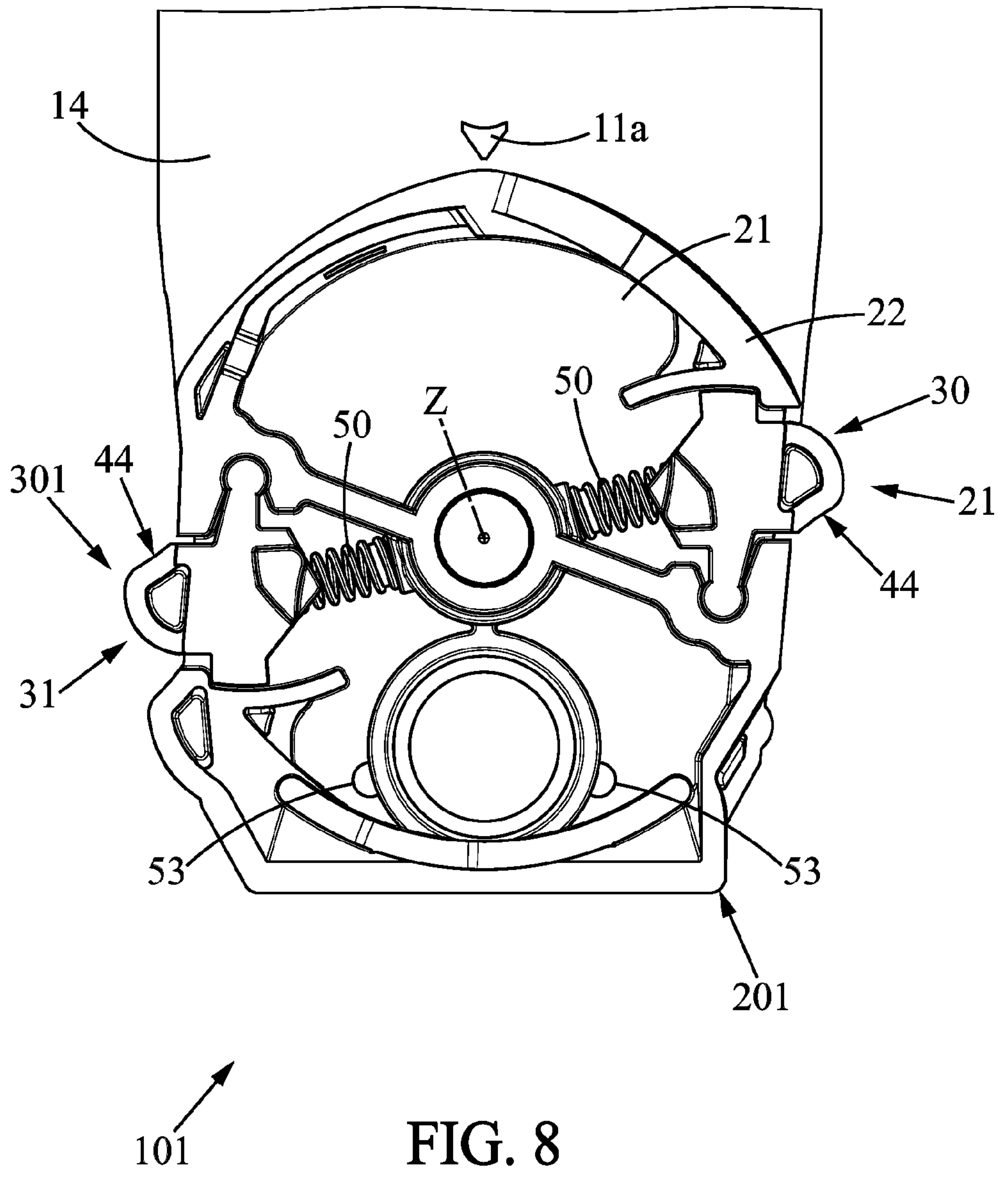
FIG. 8 is a front view of a second variant of the mode-selection button according to the first embodiment of the invention.
Figure 9:
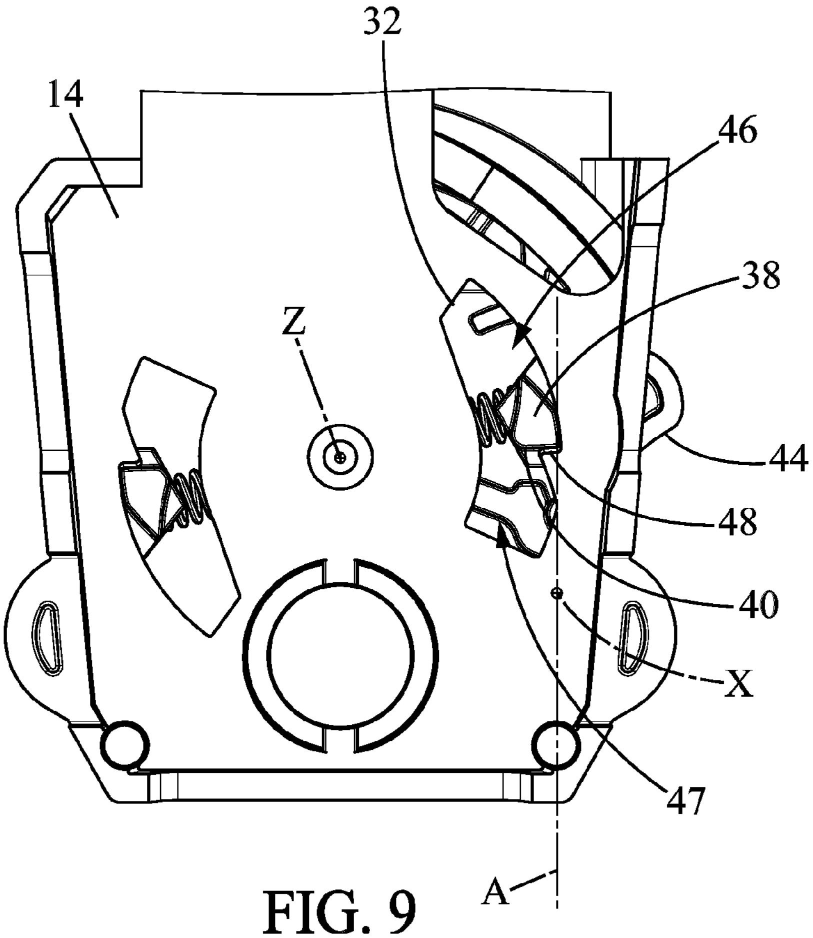
FIG. 9 is a view of a rear side of the second variant of the mode-selector switch shown in FIG. 6.

FIGS. 8 and 9 illustrate a second variant 101 of the first embodiment of the control unit. According to this second variant, the control unit 101 comprises a mode-selection button 201, a first locking/unlocking system 30 and a second locking/unlocking system 301 arranged in the mode-selection button 201 diametrically opposite to the first locking device 30 with respect to the rotation axis Z. The first locking/unlocking system 30 is identical to the previously described locking/unlocking system 30 and will not be described a second time. The second locking/unlocking system 301 has the same technical elements as the locking device 30 of the control unit 1 described above, but these technical elements are rotated through an angle of 180° in relation to the axis of rotation Z.

Thus, the operating member and the aperture of the first locking/unlocking system and the operating member and the aperture of the second locking/unlocking system are symmetrical to each other with respect to the axis of rotation Z.

When using the first embodiment 100 and the second embodiment 101 of the control unit of the first embodiment of the invention, the user must press the two operating areas 44 of the two operating members 31 to unlock the clockwise rotation of the mode-selection buttons 200, 201 from the second position 100% to the third position N.

Alternatively, the mode-selector switch has between three and five operating members. Each operating member has an operating area 44 so that the mode-selection button has between three and five operating areas.

The control unit 102 according to a second embodiment is shown in FIGS. 10 to 16. This control unit 102 is identical to the control unit 1 according to the first embodiment of the invention except for the fact that the mode-selection knob 202 is made of a plastic material capable of being deformed, the fact that the locking/unlocking system 302 comprises an operating member 310 made by a part of the mode-selection knob and the fact that it does not comprise a resilient element 50. The technical elements of the control unit 102 according to the second embodiment identical or similar to the technical elements of the control unit 1 according to the first embodiment bear the same references and will not be described a second time.

The mode-selection knob 203 of the control unit 102 according to the second embodiment is made of a plastic material suitable for deformation, such as a polyamide.

Figure 10:
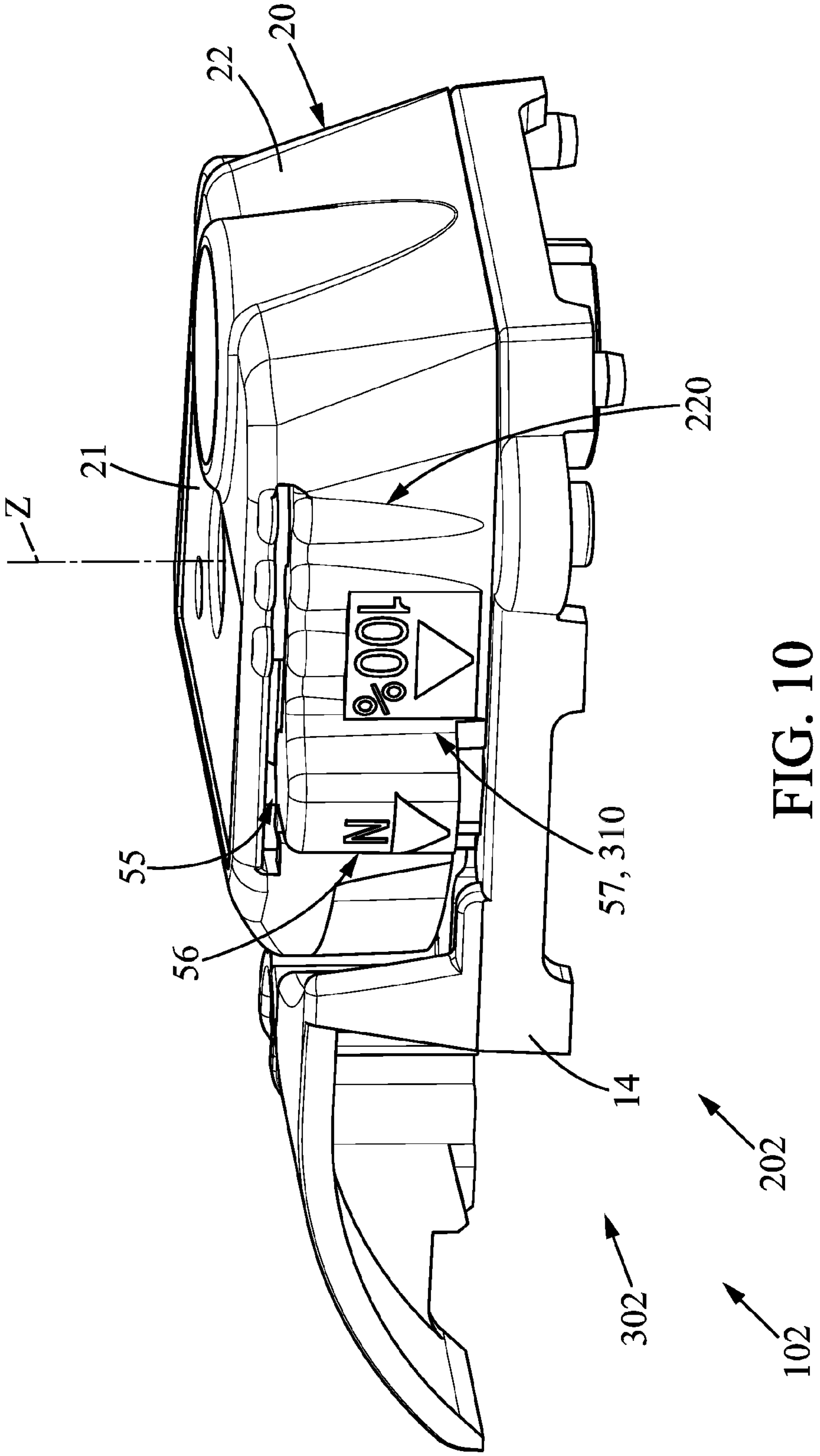
FIG. 10 is a side perspective view of a cover and a mode-selection knob of the control unit according to a second embodiment of the invention.

With reference to FIG. 10, the mode-selection knob 202 of the control unit 102 according to the second embodiment is pivotally mounted on the cover 14 about the axis of rotation Z. The mode-selector switch 202 has a bottom 21, a peripheral edge 22 surrounding the bottom and a rod 23 for attachment to the holder 14. The mode-selector knob 202 further has a through-slot 55 formed on a lateral side of the peripheral edge 22. This slot extends perpendicularly to the axis of rotation Z and is continued by a cut-out 56 which is parallel to the axis of rotation Z and opens out at the outer edge of the mode-selector button. The slot 55 and the cut-out 56 form a tab 57 capable of pivoting towards the inside of the button by deformation of a part 220 of the peripheral edge of the mode-selection button. This tab 57 forms a lever having a first pivot axis X. This tab 57 thus constitutes the operating member 310 of the locking/unlocking system of the control unit 102 according to the second embodiment. The operating member 310 is thus capable of pivoting with respect to its end fixed to the peripheral edge 22 of the mode-selection button 203.

Figure 11:
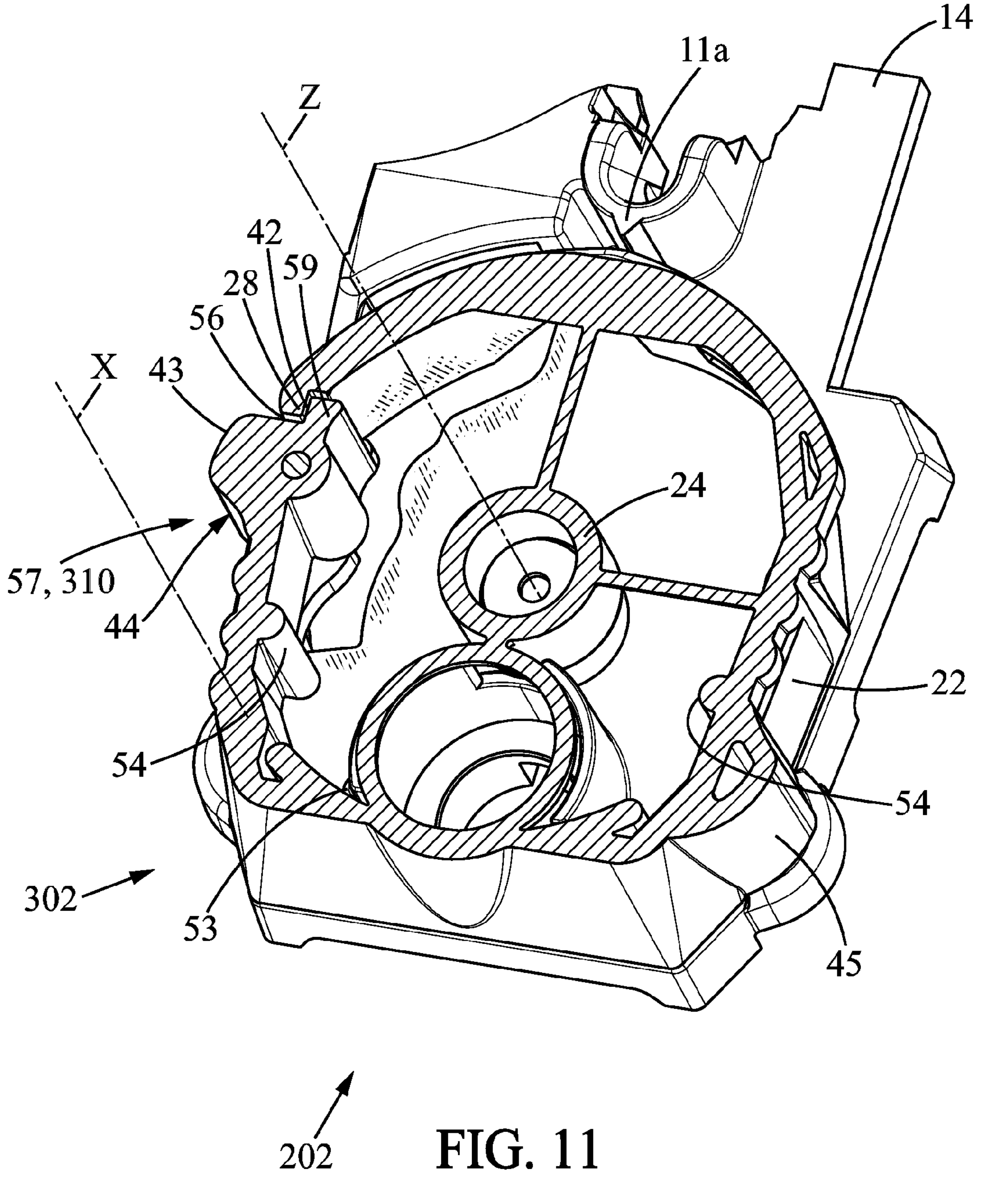
FIG. 11 is a perspective view of a cover and a mode-selection knob of the control unit according to the second embodiment of the invention wherein the mode-selection knob is cut along a plane parallel to the bottom.
Figure 12:
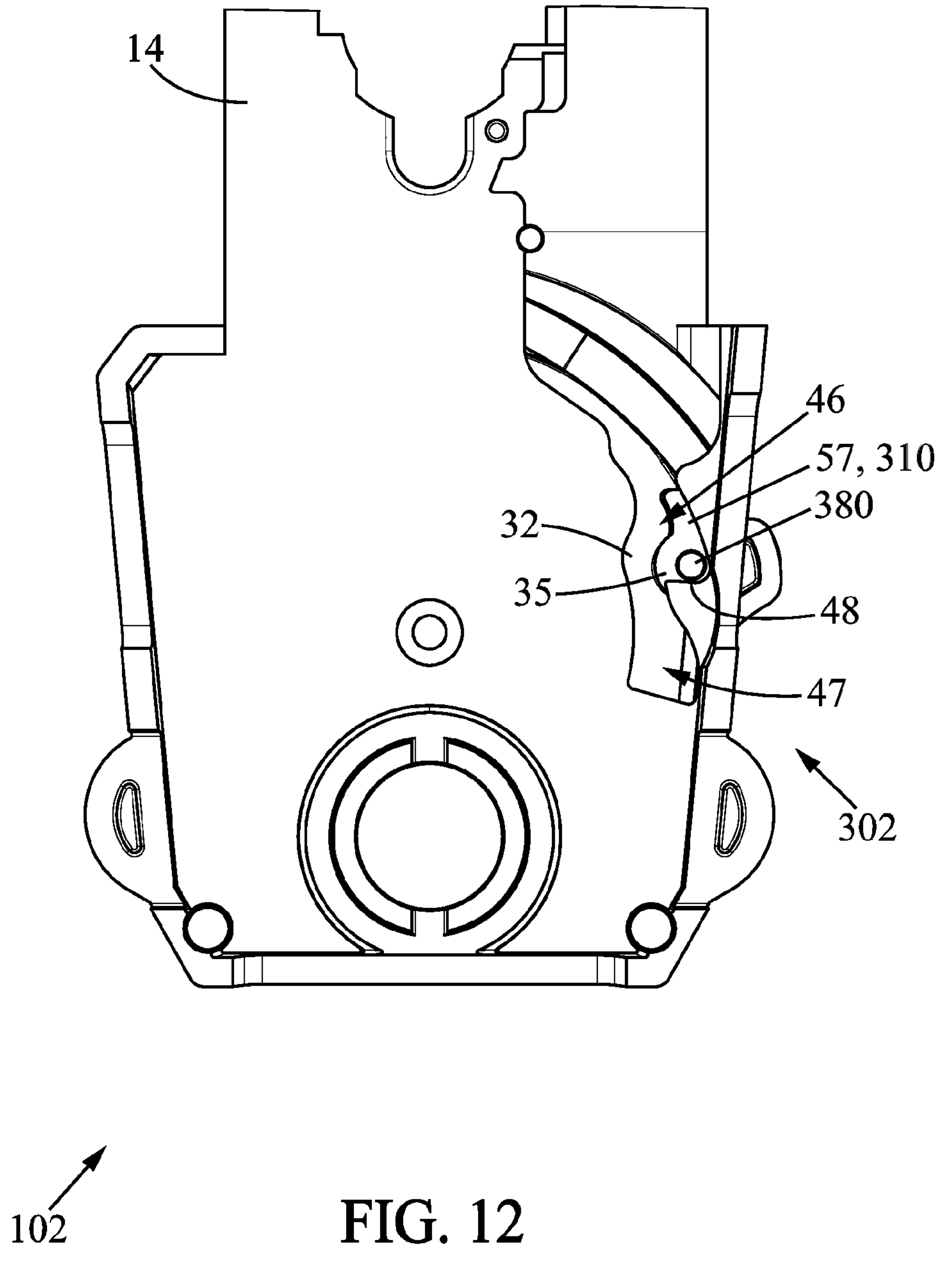
FIG. 12 is a view of a face of the cover of the control unit according to the second embodiment of the invention.

Seen in cross-section in a plane parallel to the bottom 21, as in FIG. 11, the cut-out 56 advantageously has the shape of a step or a set-back. A locking stop 28 is thus formed on the side of the mode-selection button and a shoulder 59 is formed on the side of the operating member 310. The shoulder 59 of the operating member forms a bearing face 42 adapted to abut against the locking stop 28 when the operating member 310 moves from the unlocked position to the locked position. In the illustrated embodiment, the tab 57 further comprises a first protruding portion 43 adjacent to the cut-out 56 and extending radially with respect to the rotation axis Z. This first protruding portion 43 has an operating area 44 which the user is able to press to unlock the rotation of the mode-selection button 202. With reference to FIG. 12, the main face 35 of the operating member 310 located opposite the cover 14 comprises a lug 380 arranged in the aperture 32. In the illustrated embodiment, the lug 380 has the shape of a peg. The lug 380 is adapted to move in the first aperture portion 46 and to come into abutment against the radial stop 48, when the operating member is in the locking position. The lug 380 is able to move in the first aperture portion 46 and in the second aperture portion 47, when the user presses on the tab 57—operating member 310 to put it in the unlocking position.

Figure 13:
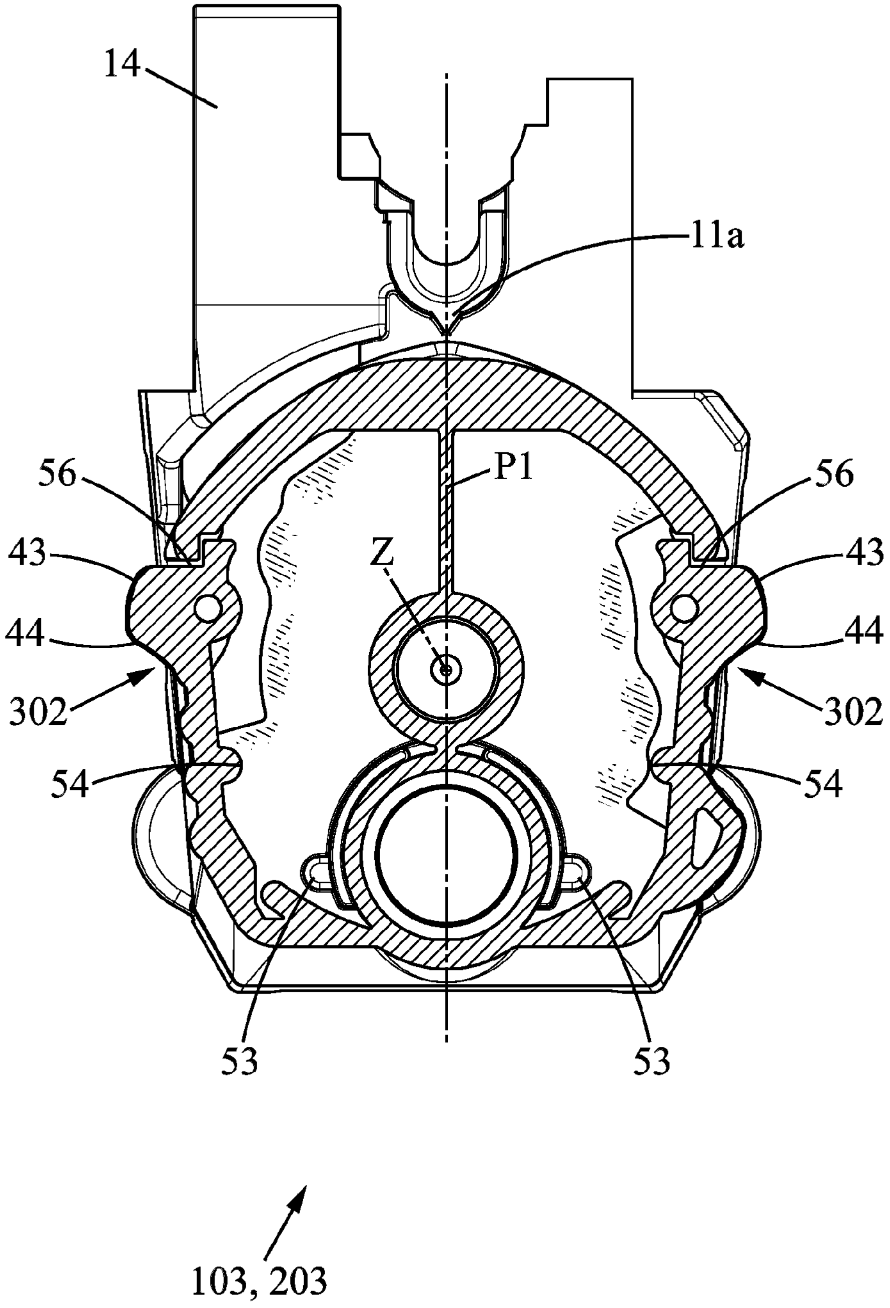
FIG. 13 is a front view of a first variant of the control unit according to the second embodiment of the invention.
Figure 14:
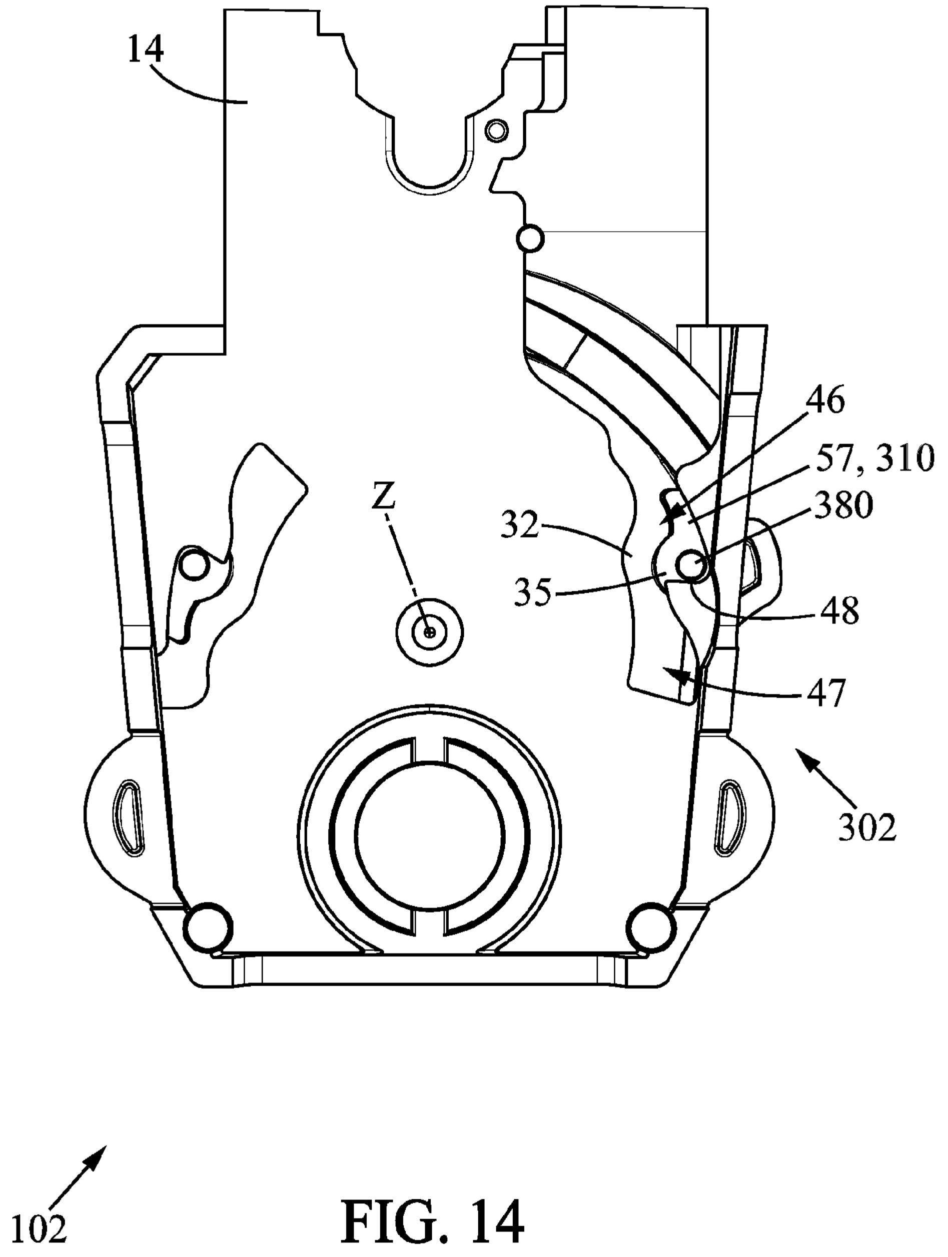
FIG. 14 is a view of a rear side of the first variant of the control unit according to the second embodiment of the invention.

FIGS. 13 and 14 illustrate a first variant 103 of the second embodiment of the control unit. According to this embodiment, the control unit 103 comprises a mode-selector button 203, a first locking/unlocking system 302 and a second locking/unlocking system 302 arranged in the mode-selector button 203. The first locking/unlocking system 302 is identical to the previously described locking/unlocking system 302 and will not be described a second time. The second locking/unlocking system 302 has the same technical elements as the locking device 302 of the previously described control unit 102, but these technical elements are arranged differently. Thus, the operating member is arranged symmetrically with respect to the radial plane P1. The radial plane P1 is perpendicular to the bottom 21 of the mode-selection knob. The radial plane P1 passes through the axis of rotation Z. In the embodiment shown, the radial plane P1 also passes through a point at the centre of the width of the cover 14. This centre is indicated by the mark 11*a*. The aperture 32 of the second locking/unlocking system 302 is rotated by an angle of approximately 150° with respect to the axis of rotation Z.

FIG. 12 illustrates a second variant 104 of the second embodiment of the control unit. According to this second embodiment, the control unit 104 comprises a mode-selector button 204, a first locking/unlocking system 302 and a second locking/unlocking system 302 arranged in the mode-selector button 204 diametrically opposite the first lock device 302 with respect to the axis of rotation Z.

The first locking/unlocking system 302 is identical to the previously described locking/unlocking system 302 and will not be described a second time. The second locking/unlocking system 302 has the same technical elements—and in particular an aperture 32 in the cover 14, an operating member 302—as the locking device 302 of the control unit 102 described above, but these technical elements are arranged symmetrically with respect to the axis of rotation Z.

When using the first embodiment 103 and the second embodiment 104 of the second embodiment of the invention, the user must press the two operating areas 44 of the two operating members 310 to unlock the clockwise rotation of the mode-selection buttons 203, 204 from the second position 100% to the third position N.

Alternatively, the mode-selector switch has between three and five operating members. Each operating member has an operating area 44 so that the mode-selection button has between three and five operating areas.

The control unit 105 according to a third embodiment is shown in FIG. 13. This control unit 105 is identical to the control unit 102 according to the second embodiment of the invention except that the locking/unlocking system 303 further comprises a resilient element 50 suitable for acting between the operating member 311 and the support wall 51 formed on the axial ring 24. In the illustrated embodiment, the support wall 51 as well as the inner side face 36 of the operating member are provided with a guide pin 52. The resilient element 50 is arranged around the guide pin 52 of the operating member 311 and around the guide pin 52 of the support wall 51.

The other technical elements of the control unit 105 according to the third embodiment are identical or similar to the technical elements of the control unit 102 according to the second embodiment and will not be described a second time.

Figure 15:
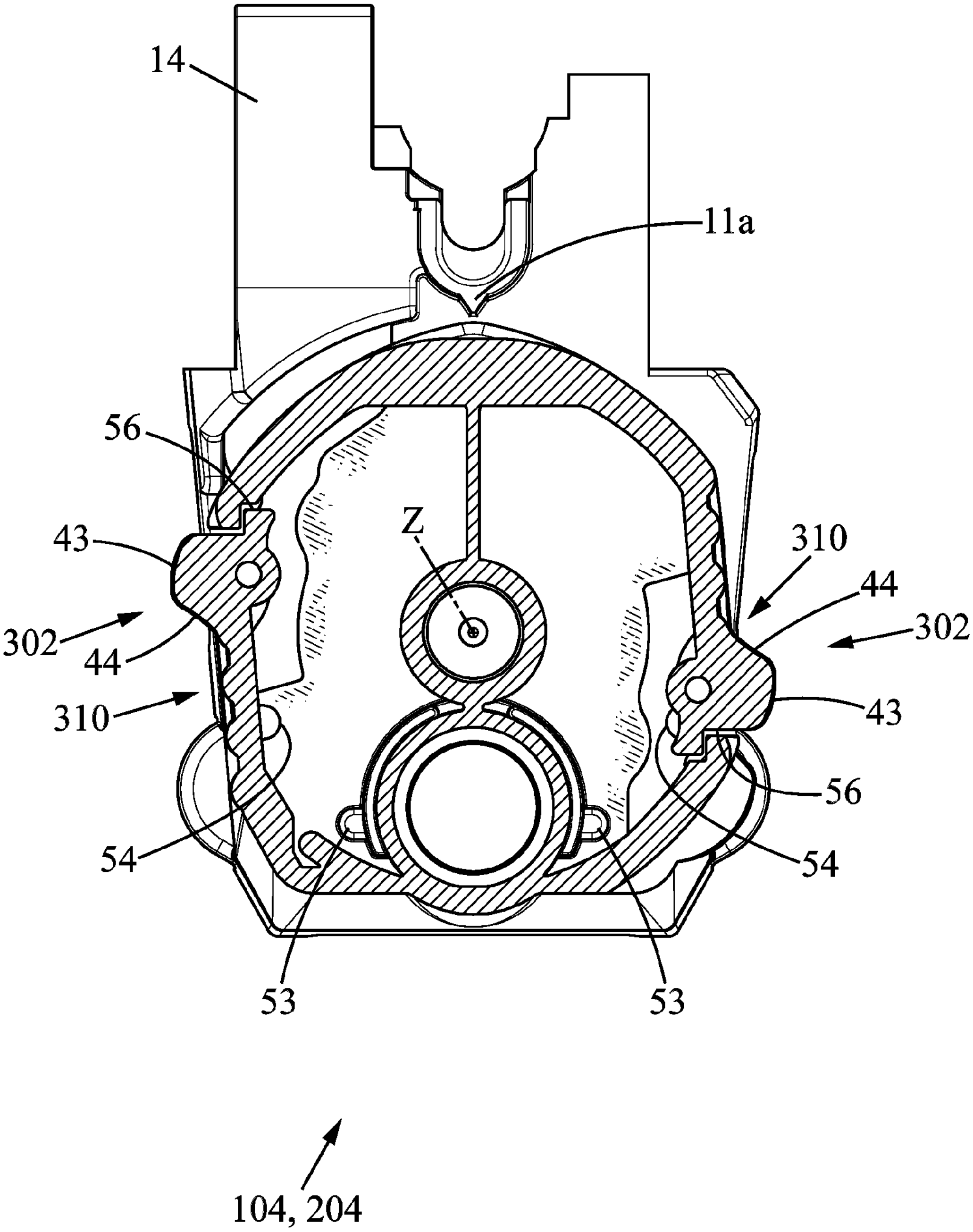
FIG. 15 is a front view of a second variant of the control unit according to the second embodiment of the invention.

The control unit 106 according to a fourth embodiment is shown in FIGS. 14 and 15. This control unit 106 comprises a mode-selection button 206 and a locking/unlocking system 304.

The locking/unlocking system 304 comprises an operating member 312 pivotally mounted with respect to the mode-selection knob 206 about the first pivot axis X, a resilient element 66 adapted to hold the operating member 312 in the locking position, and an aperture 32 formed in the cover 14.

The mode-selector button 206 has a bottom not shown in FIGS. 14 and 15, a peripheral edge 22 surrounding the bottom, an orifice surrounded by an axial ring 24. An attachment rod for the mode-selection knob is arranged in the orifice. It forms the axis of rotation Z.

A through-opening 29 is provided in a side face of the peripheral edge 22. The edge of the opening 29 on the side of the free end of the operating member 312 has a set-back forming a locking stop 28. The bottom 21 of the mode-selection button further comprises a pivot 63 extending towards the cover 14 and a support wall 64 integral with the pivot 63. The pivot 63 forms the first pivot axis X. It is parallel to the rotation axis Z. The support wall 64 is perpendicular to the bottom 21 and extends inwards from the mode selector switch. The support wall 64 forms an angle with respect to a radial plane P1 equal to half the pivot angle of the operating member 312 between the locking position and the unlocking position. The radial plane P1 passes through the axis of rotation Z and the reference mark 11*a*. The end of the support wall 64 has a notch 65.

The operating member 312 forms a lever. It comprises a longitudinally extending through-recess 60. This recess 60 has a circular cylindrical portion 61, an intermediate flared portion 58 open to the cylindrical portion 61 and a substantially rectangular parallelepiped portion 62 open to the flared portion 58. The operating member 312 is arranged in the mode-selection knob 206 such that the cylindrical portion 61 of the recess accommodates the pivot 63. Thus, the operating member 312 is capable of pivoting about a pivot 63. The support wall 64 is arranged in the flared portion 58. The support wall 64 extends against one wall of the flared portion 58 when the operating member 312 is in the locking position shown in FIG. 14, and against an opposite wall of the flared portion 58, when the operating member 312 is in the unlocking position. The resilient element 66 comprises a leaf spring arranged in the recess 60. The resilient element 66 is wedged into the recess 65 and into a recessed corner 67 of the parallelepipedic portion 62. The leaf spring 66 extends outwardly from the notch 65. The re-entrant corner 67 is located on the opposite side of the notch 65. It is adjacent to the first radial projection 43.

The operating member 312 further comprises a first radial protruding portion 43 extending through the opening 29 of the peripheral edge 22 of the mode-selector button. An operating area 44 of the mode-selection button is disposed on the first radial protruding portion 43. The operating member 312 further comprises a support face 42 located in the extension of the first radial protruding portion 43 towards the free end of the operating member. The bearing face 42 comes to bear against the locking stop 28, when the operating member comes into or is in the locking position. The main face 35 of the operating member is provided with a lug 380 arranged in the aperture 32. The aperture 32 is identical or similar to the aperture 32 of the locking/unlocking system 30 according to the second embodiment. The technical elements of the locking/unlocking system and in particular of the aperture 32 and the technical elements of the mode-selection button of the control unit 106 according to the fourth embodiment, which are identical or similar to the technical elements of the control unit according to the second embodiment, have the same references and will not be described a second time.

Figure 16:
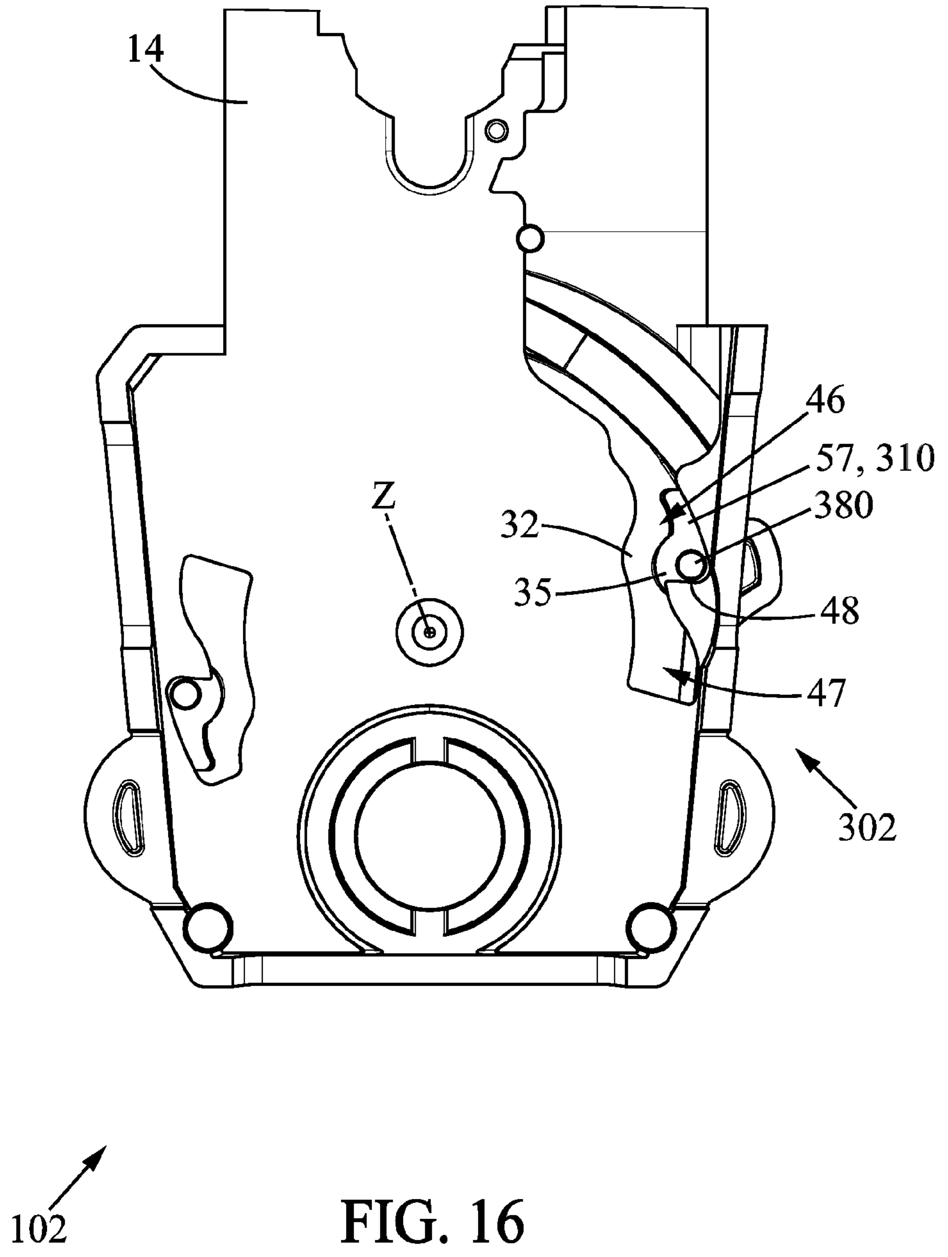
FIG. 16 is a view of a rear side of the second variant of the control unit according to the second embodiment of the invention.
Figure 17:
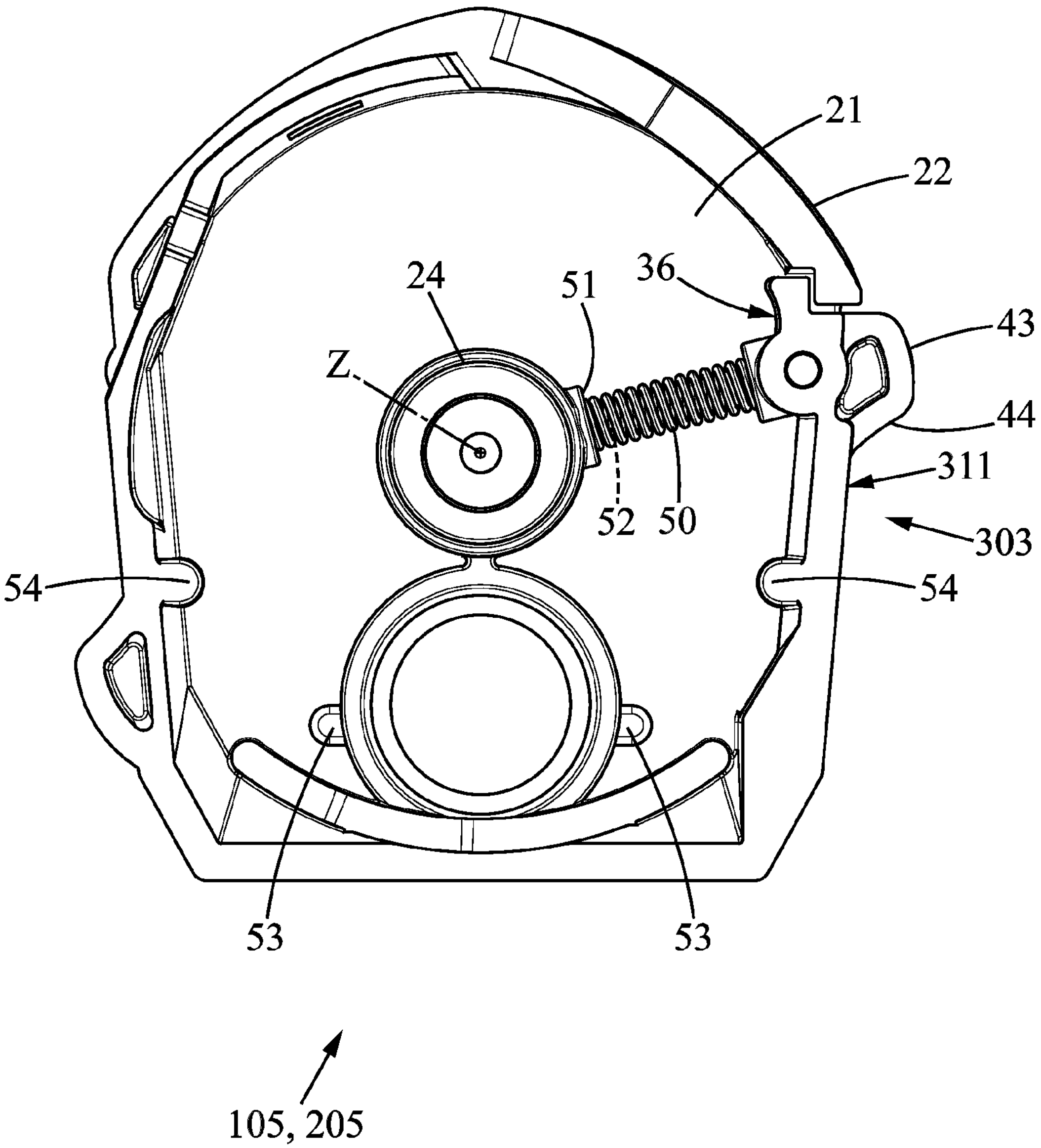
FIG. 17 is a bottom view of the mode-selection knob of a control unit according to a third embodiment of the invention.
Figure 18:
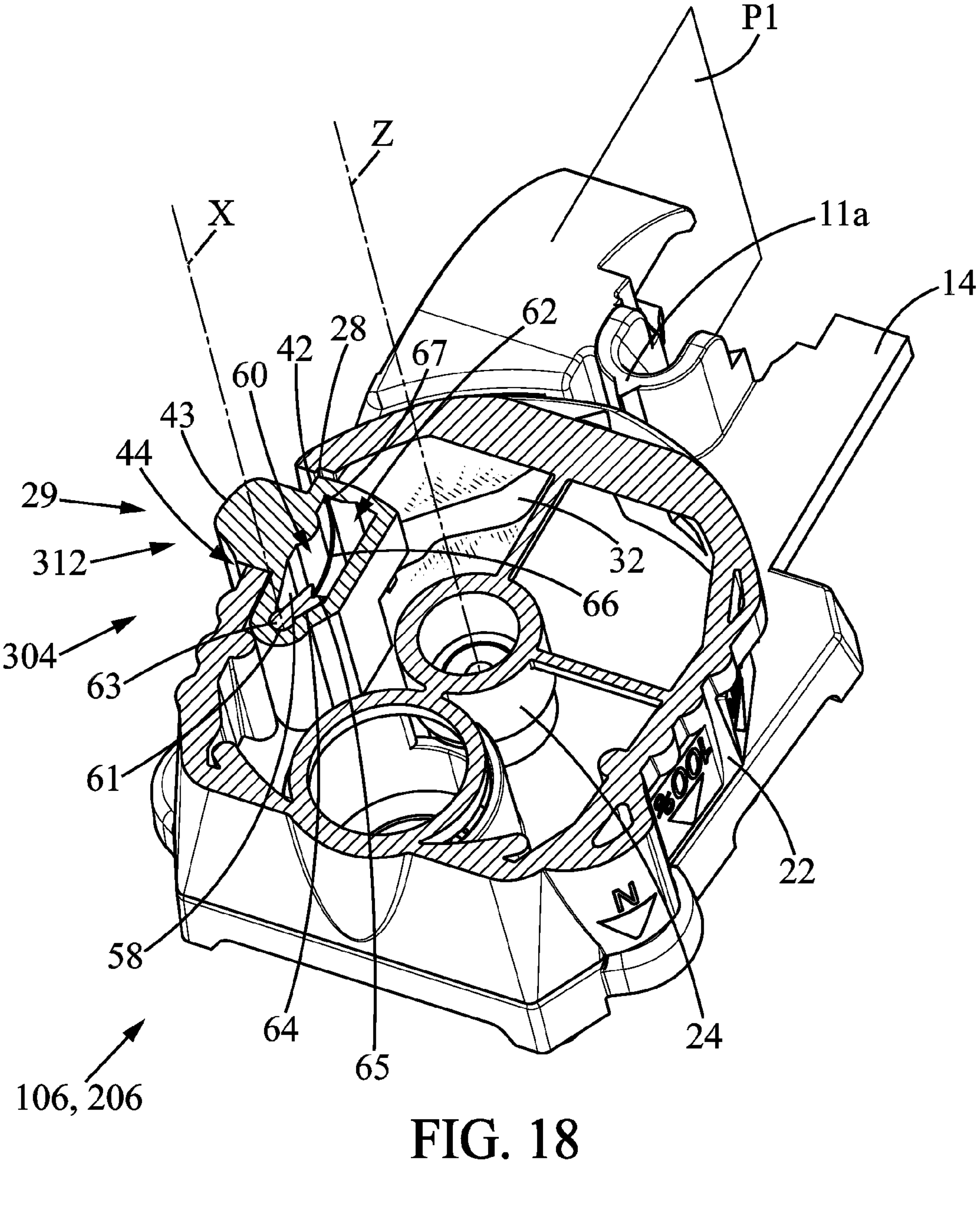
FIG. 18 is a perspective view of a control unit according to a fourth embodiment of the invention.
Figure 19:
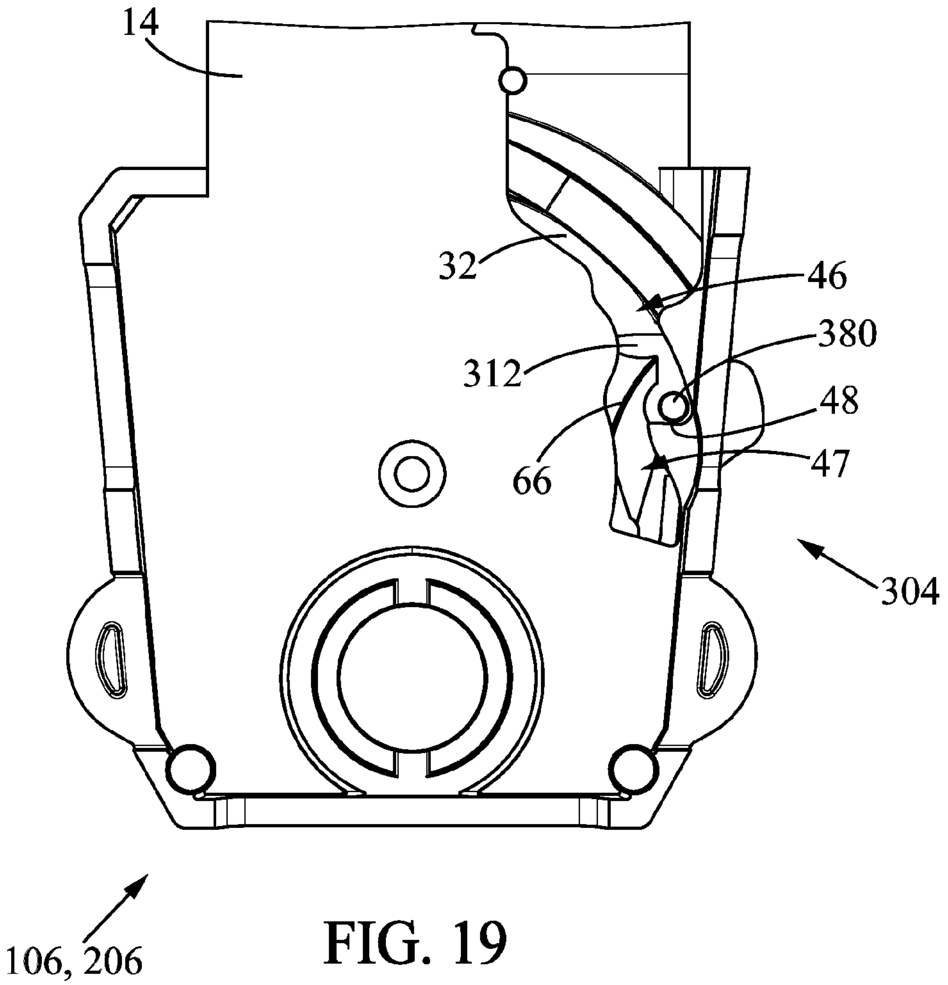
FIG. 19 is a view of a face of the cover of the control unit according to the fourth embodiment of the invention.
Figure 20:
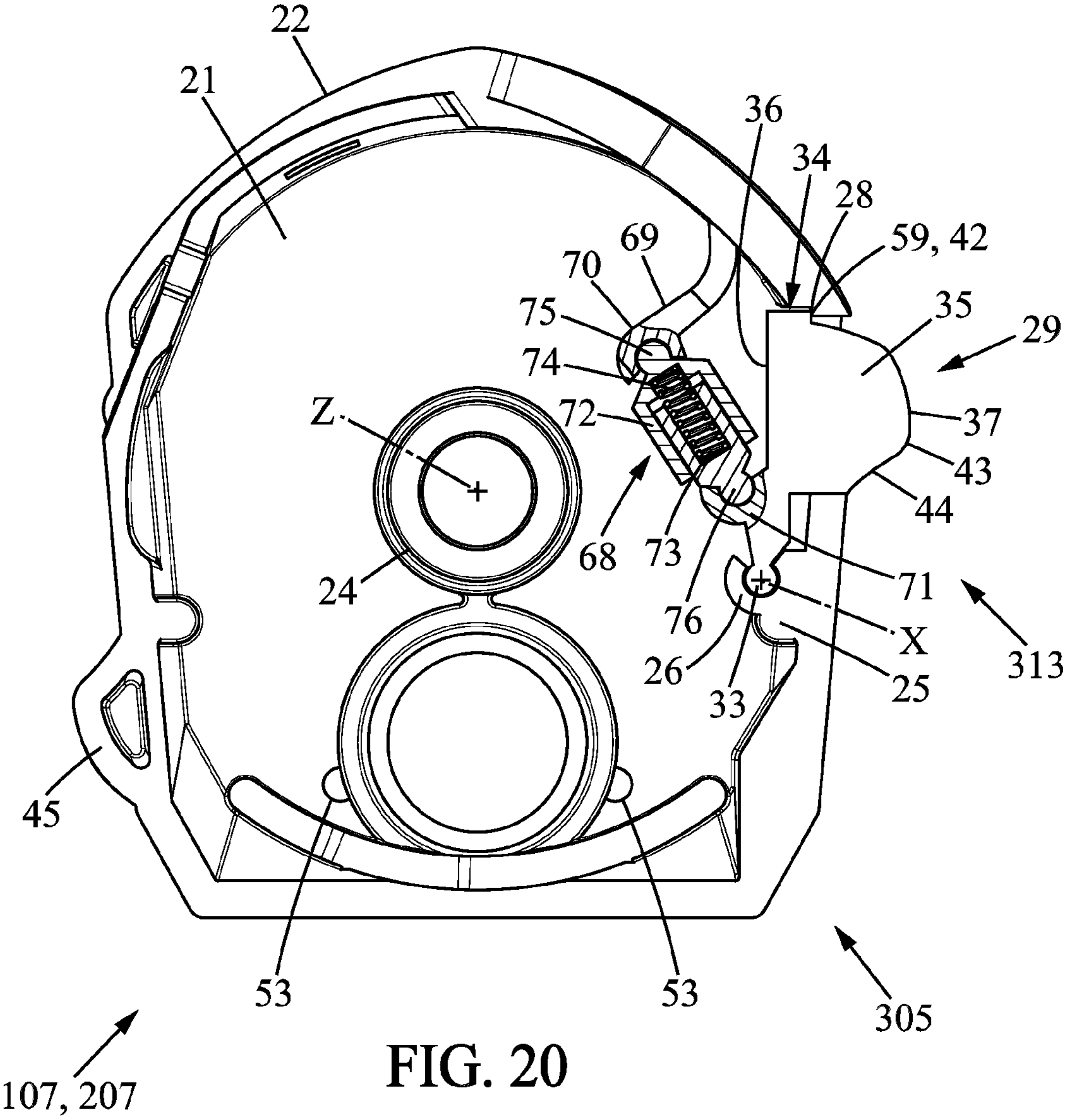
FIG. 20 is a perspective view of a control unit according to a fifth embodiment of the invention.
Figure 21:
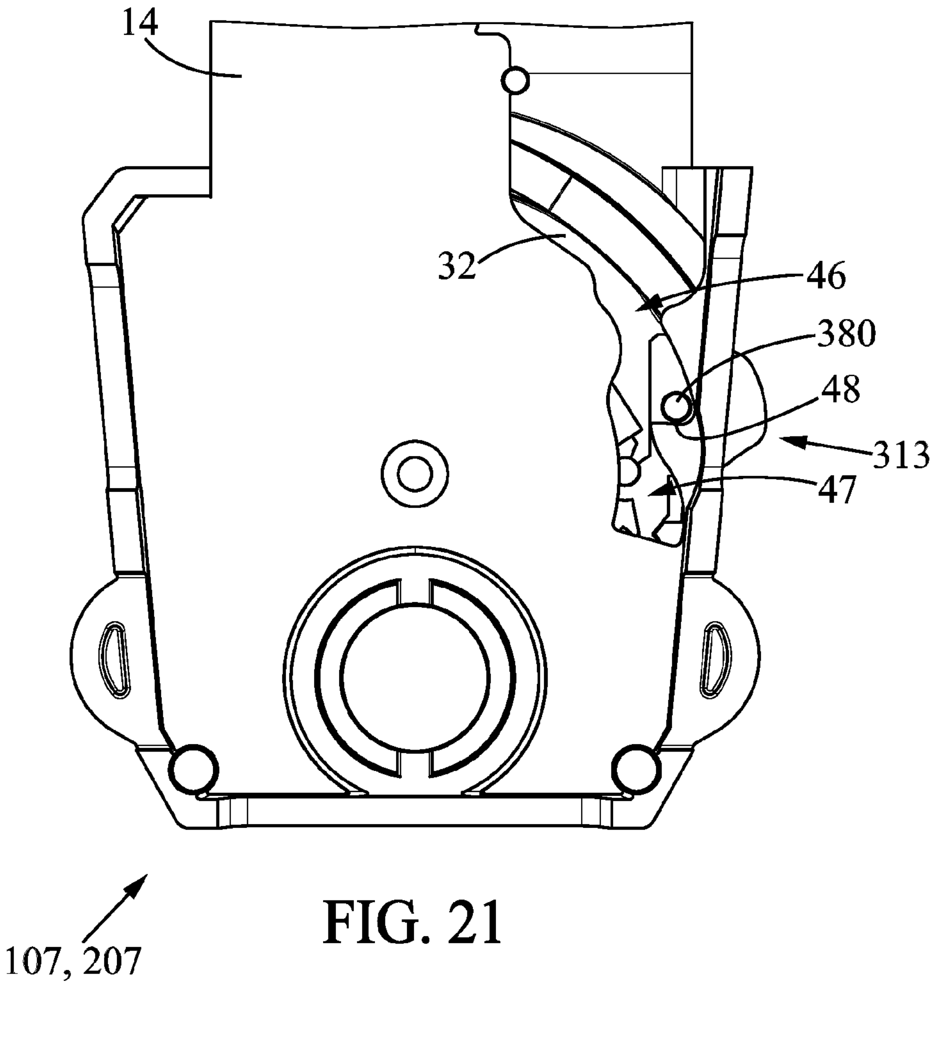
FIG. 21 is a view of a face of the cover of the control unit according to the fifth embodiment of the invention.

The control unit 107 according to a fifth embodiment is shown in FIGS. 16 and 17. This control unit 107 comprises a mode-selection button 207 and a locking/unlocking system 305. The locking/unlocking system 305 comprises an operating member 313 pivotally mounted with respect to the mode-selection knob 207 about the first pivot axis X, a resilient element 68 adapted to hold the operating member 313 in the locking position, and an aperture 32 formed in the cover 14.

The mode-selector switch 207 has a bottom 21 with a hole, with a peripheral edge 22 surrounding the bottom 21. A side face of the peripheral edge 22 is provided with a through-opening 29. The edge of the opening 29 on the side of the free end of the operating member 313 has a set-back forming a locking stop 28. The mode-selection button 207 further comprises a support block 25 provided with a tubular cavity 26 and a support wall 69 on which the resilient element 68 comes to rest. The support wall 69 is perpendicular to the bottom 21. It extends from the peripheral edge 22 towards the opening of the mode-selection button. The free end of the support wall 69 comprises a part 70 of a second hinge member adapted to hinge to the resilient element 68.

The operating member 313 is a lever capable of pivoting about a first pivot axis X between a locking position and an unlocking position. The operating member 313 comprises a pivot 33 at one of its ends, an end face 34 at its other end, two main faces 35 parallel to the bottom 31 and two lateral faces 36, 37 parallel to each other and perpendicular to the bottom 31. The pivot 33 is arranged in the tubular cavity 26 of the support block so that the operating member 313 is able to pivot about the first pivot axis X. The end face 34 comprises a shoulder 59 forming a support face 42 capable of coming into abutment against the locking stop 28. One of the main faces 35 located opposite the base 21 is provided with a lug 380 arranged in the aperture 32. The inner lateral face 36 of the operating member comprises a part 71 of a first articulation element capable of articulating to the resilient element 68. The outer side face 37 is provided with a first radial protruding portion 43 passing through the through aperture 29 and having an operating area 44 on which the user presses to rotate the operating member into the unlocking position.

The resilient element 68 comprises a first hollow cylinder 72, a second hollow cylinder 73 slidably mounted around the first hollow cylinder and a compression spring 74 contained partly within the first hollow cylinder and partly within the second hollow cylinder. The first hollow cylinder and the second hollow cylinder have a bottom wall. The compression spring 74 is attached to the bottom wall of the first hollow cylinder and to the bottom wall of the second hollow cylinder. The first hollow cylinder 72 comprises a complementary portion 75 of the first hinge element. The second hollow cylinder 73 comprises a complementary portion 76 of the second hinge element. In the illustrated embodiment, the first hinge and the second hinge are formed by a circular housing 70,71 and a pivot 75,76 mounted in the circular housing.

With reference to FIG. 17, the aperture 32 is identical to the aperture 32 of the locking/unlocking system 30 according to the second embodiment. The technical elements of the locking/unlocking system, and in particular of the aperture 32, and the technical elements of the mode-selection button of the control unit 107 according to the fifth embodiment, which are identical or similar to the technical elements of the control unit according to the second embodiment, have the same references and will not be described a second time.

When the user does not press the operating member 313, the resilient element 68 holds the operating member 313 such that the bearing face 42 is in abutment with the locking stop 28. The user may move the mode-selector switch 207 between the first EMER position and the second 100% position. The user cannot dispose the mode-selector knob 207 in the third position N because the lug 380 is in abutment with the radial stop 48.

When the user presses the operating area 44 of the operating member 313, the operating member 313 pivots about the first pivot axis X. The spring 74 is compressed. The resilient element 68 pivots relative to the mode-selector switch 207 by means of the first joint 70, 75 and relative to the operating member 313 by means of the second hinge 71, 76. The lug 380 slides in the second aperture portion 47 allowing the mode-selection knob 307 to pivot from the second position 100% to the third position N.

According to a first variant, not shown, of the third embodiment, the fourth embodiment and the fifth embodiment, the control unit 105, 106, 107 comprises a member for operating a first locking/unlocking system and a member for operating a second locking/unlocking system arranged, in the mode-selection button, symmetrically to the member for operating the first locking/unlocking system with respect to a radial plane P1. The radial plane P1 is identical to the radial plane P1 described above.

According to a second variant, not shown, of the third, fourth and fifth embodiments, the control unit 105, 106, 107 comprises a first locking/unlocking system, and a second locking/unlocking system arranged in the mode-selection knob diametrically opposite the first locking device with respect to the axis of rotation Z.

The invention claimed is:

1. A control unit for an aircraft crew member's breathing mask, said unit comprising:

a support, a mode-selection knob mounted on the support and configured to pivot with respect to an axis of rotation, the axis of rotation being arranged perpendicular to said support, the mode-selection knob having a bottom extending perpendicular to the axis of rotation and a peripheral rim, the selection knob being pivotal between at least a first position, a second position and a third position, a controller configured to be supplied from a source of breathing gas and to supply a breathing cavity with the breathing gas in at least the following three modes of operation:

when the mode-selection knob is in the first position, the controller supplies the breathing cavity as long as the pressure in the breathing cavity is not higher than a first pressure relative to the ambient pressure, when the mode-selection knob is in the second position, the controller supplies the breathing cavity as long as the pressure in the breathing cavity is not higher than a second pressure relative to the ambient pressure, the first pressure being higher than the second pressure, and when the mode-selection knob is in the third position, the controller supplies the breathing cavity with breathing gas diluted with air, wherein the control unit further comprises at least one locking/unlocking system configured to lock and to unlock the rotation of the mode-selection knob towards the third position, the locking/unlocking system comprising an operating member configured to be pivoted between a position locking the rotation of the mode-selection knob such that rotation of the mode-selection knob between the first and second positions is allowed, but rotation to the third position is blocked, and a position unlocking the rotation of the mode-selection knob such that the rotation to the third position is allowed.

2. The control unit according to claim 1, wherein the second position is positioned between the first position and the third position, and wherein said locking/unlocking system comprises an aperture formed in said holder holder, said aperture comprising a radial stop delimiting a first aperture portion and a second aperture portion, and wherein the operating member comprises a lug configured to slide in the first aperture portion and to abut against said radial stop when the operating member is positioned in the locking position, the said lug being configured to slide in at least the second aperture portion when the operating member is in the unlocking position.

3. The control unit according to claim 2, wherein said aperture has the shape of at least one arc of a circle centered on the axis of rotation.

4. The control unit according to claim 2, wherein the first aperture portion and the second aperture portion have the shape of an arc of a circle and wherein the arc of the circle of the second aperture portion has a radius different from the radius of the arc of the circle of the first aperture portion; the first aperture portion having a radial end wall forming said radial stop for blocking the passage of the lug into the second aperture portion when the operating member is in the locking position.

5. The control unit according to claim 1, wherein the operating member comprises a lever mounted so as to pivot with respect to the mode-selection knob about a first pivoting axis, the first pivoting axis being parallel to the axis of rotation.

6. The control unit according to claim 2, wherein the operating member comprises a lever mounted so as to pivot with respect to the mode-selection knob about a first pivoting axis, the first pivoting axis being parallel to the axis of rotation, and wherein said lug and said radial stop are disposed on one side of a plane, and wherein the operating member has an operating area disposed on the other side of said plane, said operating area being an area on which the user acts to unlock the rotation of the mode-selection knob; said plane being perpendicular to the bottom and passing through said first pivot axis and an end stop.

7. The control unit according to claim 1, wherein the locking/unlocking system comprises a resilient element configured to hold the operating member in the locking position, the resilient element being configured to act between the operating member and a support wall of the mode-selection knob.

8. The control unit according to claim 7, wherein the resilient element comprises at least one compression spring configured to be compressed by pressing on a part of the operating member in order to unlock the rotation of the mode-selection knob towards the third position.

9. The control unit according to claim 1, wherein the peripheral rim of the mode-selection knob comprises a slot perpendicular to the axis of rotation which is extended by a cut-out parallel to the axis of rotation and opening outside the mode-selection knob, and wherein a part of the peripheral rim delimited by the said slot and the said cut-out forms the operating member, the operating member being able to pivot by deformation of an axial part of the peripheral rim.

10. The control unit according to claim 7, wherein the operating member has a through-recess, a part of the through-recess is in the form of a flare, another portion of the through-recess having a re-entrant corner open to the flare, and wherein the support wall is perpendicular to the bottom and extends into the through-recess, said support wall being provided with a radial notch, the resilient element comprising at least one leaf spring wedgedly secured in said radial notch and in the re-entrant corner.

11. The control unit according to claim 5, wherein the operating member comprises a through-recess, a part of the through-recess having a cylindrical shape, and wherein a support wall of the mode-selection knob comprises at one end thereof a pivot arranged in the cylindrical portion of the recess, said pivot forming the first pivot axis.

12. The control unit according to claim 5, wherein the locking/unlocking system comprises a resilient element adapted to hold the operating member in the locking position, the resilient element being adapted to act between the operating member and a support wall of the mode-selection knob, a first hinge element being arranged between said resilient element and the mode-selection knob and a second hinge element being arranged between said resilient element and the operating member.

13. The control unit according to claim 12, wherein the resilient element comprises a compression spring, a first hollow cylinder with a bottom wall and a second hollow cylinder with a bottom wall; and wherein the second hollow cylinder is slidable about the first hollow cylinder, the compression spring being housed partly in the first hollow cylinder and partly in the second hollow cylinder, the compression spring being attached to said bottom wall of the first hollow cylinder and to the bottom wall of the second hollow cylinder.

14. The control unit according to claim 1, wherein said locking/unlocking system is a first locking/unlocking system and wherein said control unit comprises a second locking/unlocking system arranged diametrically opposite to the first lock device with respect to the axis of rotation.

15. The control unit according to claim 1, wherein said locking/unlocking system is a first locking/unlocking system, and wherein said control unit comprises a second locking/unlocking system, an operating member of the second locking device being arranged symmetrically opposite the operating member of the first locking device with respect to a radial plane perpendicular to the bottom, said radial plane passing through the axis of rotation.

* * * * *